US012387011B2

(12) United States Patent
Vaassen

(10) Patent No.: US 12,387,011 B2
(45) Date of Patent: Aug. 12, 2025

(54) SECURED COMPUTER MEMORY

(71) Applicant: Synopsys, Inc., Mountain View, CA (US)

(72) Inventor: Adrianus Wpgg Vaassen, Waalre (NL)

(73) Assignee: SYNOPSYS, INC., Sunnyvale, CA (US)

( * ) Notice: Subject to any disclaimer, the term of this patent is extended or adjusted under 35 U.S.C. 154(b) by 282 days.

(21) Appl. No.: 17/972,318

(22) Filed: Oct. 24, 2022

(65) Prior Publication Data

US 2024/0135040 A1    Apr. 25, 2024
US 2024/0232436 A9    Jul. 11, 2024

(51) Int. Cl.
*G06F 21/64*    (2013.01)

(52) U.S. Cl.
CPC .................... *G06F 21/64* (2013.01)

(58) Field of Classification Search
CPC .......... G06F 21/64; G06F 21/79; G11C 29/38
See application file for complete search history.

(56) References Cited

U.S. PATENT DOCUMENTS

| | | | | |
|---|---|---|---|---|
| 8,027,117 | B1* | 9/2011 | Sutardja | G11B 20/10222 360/75 |
| 8,782,435 | B1* | 7/2014 | Ghose | G06F 12/0862 712/216 |
| 9,019,642 | B1* | 4/2015 | Xia | G11B 20/10009 360/39 |
| 9,213,866 | B1* | 12/2015 | Ahmad | G06F 21/76 |
| 9,471,793 | B2* | 10/2016 | Gail | G06F 21/00 |
| 9,502,139 | B1* | 11/2016 | Cheriton | G06F 11/1469 |
| 10,019,384 | B2 | 7/2018 | Bowler et al. | |
| 10,019,603 | B2 | 7/2018 | Elias et al. | |
| 10,579,586 | B1* | 3/2020 | Golpayegani | G06F 16/9014 |
| 10,747,878 | B1* | 8/2020 | Jakobsson | H04L 63/12 |
| 10,754,788 | B1* | 8/2020 | Wallace | G06F 3/0616 |
| 10,949,289 | B1* | 3/2021 | Monakhov | G06F 3/0673 |
| 11,269,786 | B2* | 3/2022 | Bolotov | G06F 21/44 |
| 11,354,445 | B2* | 6/2022 | Chhabra | G06F 21/64 |
| 11,507,452 | B1* | 11/2022 | Yoon | G06F 11/1004 |
| 11,561,898 | B1* | 1/2023 | Grubisic | G06F 3/062 |
| 11,599,468 | B1* | 3/2023 | Turner | G06F 12/023 |
| 11,663,128 | B1* | 5/2023 | Shveidel | G06F 12/0868 711/141 |
| 11,997,209 | B1* | 5/2024 | Chopra | H04L 9/3239 |
| 2002/0178339 | A1* | 11/2002 | Beukema | G06F 12/1081 711/E12.067 |
| 2005/0076226 | A1* | 4/2005 | Boivie | G06F 21/64 713/190 |
| 2006/0253708 | A1* | 11/2006 | Bardouillet | G06F 21/79 713/176 |

(Continued)

*Primary Examiner* — Aravind K Moorthy
(74) *Attorney, Agent, or Firm* — Womble Bond Dickinson (US) LLP

(57) ABSTRACT

A memory protection circuit is configured to: receive data to be written to a memory; iteratively update a running integrity verification value based on portions of the data to determine a calculated integrity verification value and write the portions of the data to a memory region in the memory; determine a verification result based on a comparison between the calculated integrity verification value and a reference integrity verification value associated with the data; and control access to the memory region of the memory based on the verification result.

18 Claims, 10 Drawing Sheets

(56) References Cited

U.S. PATENT DOCUMENTS

| | | | |
|---|---|---|---|
| 2007/0204078 A1* | 8/2007 | Boccon-Gibod | G06F 21/64 710/54 |
| 2007/0260623 A1* | 11/2007 | Jaquette | G06F 11/1004 |
| 2007/0294496 A1* | 12/2007 | Goss | G06F 12/1408 711/163 |
| 2008/0065825 A1* | 3/2008 | Fang | G11B 20/10527 711/112 |
| 2008/0263262 A1* | 10/2008 | Sokolov | G11C 16/20 711/E12.001 |
| 2009/0055893 A1* | 2/2009 | Manessis | G06Q 20/4016 726/2 |
| 2009/0055906 A1* | 2/2009 | von Wendorff | G06F 12/1425 726/5 |
| 2009/0158427 A1* | 6/2009 | Kim | H04L 63/1408 726/22 |
| 2009/0213674 A1* | 8/2009 | Koeppe | G11C 8/08 365/230.01 |
| 2009/0222675 A1* | 9/2009 | Lange | G06F 21/64 711/216 |
| 2010/0182158 A1* | 7/2010 | Borghetti | G11B 27/36 340/669 |
| 2010/0220853 A1* | 9/2010 | Schneider | H04L 9/0643 380/29 |
| 2011/0085657 A1* | 4/2011 | Matthews, Jr. | G06F 21/78 380/28 |
| 2011/0113244 A1* | 5/2011 | Chou | H04L 9/3271 713/168 |
| 2011/0185435 A1* | 7/2011 | Chang | G06F 12/14 711/E12.091 |
| 2012/0096564 A1* | 4/2012 | Li | H04L 63/123 707/698 |
| 2012/0185741 A1* | 7/2012 | Grekhov | G06F 11/362 714/719 |
| 2013/0166514 A1* | 6/2013 | Schultz | G06F 16/137 707/690 |
| 2013/0166909 A1* | 6/2013 | Agrawal | H04L 63/123 713/168 |
| 2013/0268496 A1* | 10/2013 | Baldwin | G06F 16/1748 707/E17.002 |
| 2014/0279562 A1* | 9/2014 | Ignatchenko | G06F 21/74 705/71 |
| 2014/0281455 A1* | 9/2014 | Kochar | G06F 9/441 713/2 |
| 2015/0058854 A1* | 2/2015 | Janssen | G06F 9/526 718/102 |
| 2015/0098272 A1* | 4/2015 | Kasorla | G06F 3/0625 365/185.11 |
| 2015/0150145 A1* | 5/2015 | Jones | G06F 21/79 726/27 |
| 2015/0244716 A1* | 8/2015 | Potlapally | H04L 63/0853 713/155 |
| 2015/0286584 A1* | 10/2015 | Humphries | G06F 12/1441 711/152 |
| 2016/0070630 A1* | 3/2016 | Williams | G06F 11/3648 714/33 |
| 2016/0117449 A1* | 4/2016 | Hunn | G16H 10/60 713/193 |
| 2016/0134628 A1* | 5/2016 | Bowler | G06F 21/78 713/170 |
| 2016/0267024 A1* | 9/2016 | Bowler | G06F 3/0623 |
| 2016/0283300 A1* | 9/2016 | Stark | G06F 11/0751 |
| 2016/0283750 A1* | 9/2016 | Durham | G06F 12/1408 |
| 2016/0315765 A1* | 10/2016 | Zheng | H04L 9/0894 |
| 2016/0350302 A1* | 12/2016 | Lakshman | G06F 16/9014 |
| 2016/0378687 A1* | 12/2016 | Durham | H04L 9/3242 713/193 |
| 2017/0083441 A1* | 3/2017 | Cheng | G06F 12/0842 |
| 2017/0090983 A1* | 3/2017 | Kovalev | G06F 12/0842 |
| 2017/0099147 A1* | 4/2017 | Salmon-Legagneur | H04L 9/3242 |
| 2017/0116437 A1* | 4/2017 | Gammel | G06F 21/556 |
| 2017/0220487 A1* | 8/2017 | Jung | G06F 12/1408 |
| 2017/0286307 A1* | 10/2017 | Harvey | G06F 12/1018 |
| 2017/0364707 A1* | 12/2017 | Lal | G06F 21/6218 |
| 2018/0069854 A1* | 3/2018 | Chakraborty | H04L 9/3231 |
| 2018/0091308 A1* | 3/2018 | Durham | H04L 9/3242 |
| 2018/0157837 A1* | 6/2018 | Teal | G06F 21/52 |
| 2018/0211046 A1* | 7/2018 | Muttik | G06F 21/566 |
| 2018/0211064 A1* | 7/2018 | Ndu | G06F 21/78 |
| 2019/0042482 A1* | 2/2019 | Katragada | G06F 21/79 |
| 2019/0042799 A1* | 2/2019 | Durham | G06F 21/64 |
| 2019/0122727 A1* | 4/2019 | Le Gallo-Bourdeau | G06F 17/16 |
| 2019/0129624 A1* | 5/2019 | Bandukwala | G06F 16/137 |
| 2019/0236019 A1* | 8/2019 | McNeeney | G06F 12/0215 |
| 2019/0251275 A1* | 8/2019 | Ramrakhyani | G06F 21/6218 |
| 2019/0296894 A1* | 9/2019 | Nuñez | H04L 9/0631 |
| 2019/0310921 A1* | 10/2019 | Lee | G06F 3/0616 |
| 2019/0325142 A1* | 10/2019 | Trikalinou | G06F 21/575 |
| 2019/0340262 A1* | 11/2019 | O'Hare | G06F 16/1748 |
| 2019/0356486 A1* | 11/2019 | Vishwanath | H04L 9/3239 |
| 2019/0370114 A1* | 12/2019 | Troia | G06F 21/64 |
| 2020/0073993 A1* | 3/2020 | Mutreja | G06F 16/273 |
| 2020/0134142 A1* | 4/2020 | Kim | H04L 9/3228 |
| 2020/0136652 A1* | 4/2020 | Chen | H03M 13/373 |
| 2020/0142992 A1* | 5/2020 | Ocher | G06F 16/235 |
| 2020/0184067 A1* | 6/2020 | Kanai | G06F 21/64 |
| 2020/0201788 A1* | 6/2020 | Bissey | G06F 3/0619 |
| 2020/0210077 A1* | 7/2020 | Keeth | G06F 3/0679 |
| 2020/0242258 A1* | 7/2020 | Smith | H04L 9/3268 |
| 2020/0264976 A1* | 8/2020 | Hoogerbrugge | G06F 12/1441 |
| 2020/0272533 A1* | 8/2020 | Privitt | G06F 11/1637 |
| 2020/0280550 A1* | 9/2020 | Lindemann | H04L 9/3247 |
| 2020/0327098 A1* | 10/2020 | Gonczi | G06F 16/1752 |
| 2020/0334171 A1* | 10/2020 | Meier | G06F 21/6218 |
| 2020/0344062 A1* | 10/2020 | Haldar | H04L 63/0428 |
| 2021/0034547 A1* | 2/2021 | Riley | G06F 12/1483 |
| 2021/0117555 A1* | 4/2021 | Bernat | H04L 9/30 |
| 2021/0133114 A1* | 5/2021 | Moyer | G06F 12/126 |
| 2021/0200631 A1* | 7/2021 | Palmer | G06F 21/64 |
| 2021/0203496 A1* | 7/2021 | Cariello | G06F 12/1441 |
| 2021/0209077 A1* | 7/2021 | Snellman | G06F 9/541 |
| 2021/0224042 A1* | 7/2021 | Sandberg | H04L 9/3242 |
| 2021/0263746 A1* | 8/2021 | Thom | G06F 3/0685 |
| 2021/0264048 A1* | 8/2021 | Holopainen | G06F 13/16 |
| 2021/0271287 A1* | 9/2021 | Jose | G06F 9/4837 |
| 2021/0342174 A1* | 11/2021 | Bursell | G06F 9/45558 |
| 2021/0351932 A1* | 11/2021 | Gray | H04L 9/0643 |
| 2021/0373994 A1* | 12/2021 | Musalay | G06F 11/3037 |
| 2021/0389884 A1* | 12/2021 | Sundararaman | G06F 3/0679 |
| 2021/0397714 A1* | 12/2021 | Halter | G06F 9/445 |
| 2022/0006835 A1* | 1/2022 | Gray | H04L 9/085 |
| 2022/0012188 A1* | 1/2022 | Durham | G06F 21/79 |
| 2022/0014379 A1* | 1/2022 | Avanzi | H04L 9/3242 |
| 2022/0129593 A1* | 4/2022 | Tsirkin | G06F 21/79 |
| 2022/0148670 A1* | 5/2022 | Lee | G11C 29/52 |
| 2022/0200807 A1* | 6/2022 | Pattamatta | H04L 9/0643 |
| 2022/0206938 A1* | 6/2022 | Shin | G06F 12/0246 |
| 2022/0261505 A1* | 8/2022 | Hatakeyama | H04L 9/0897 |
| 2022/0271877 A1* | 8/2022 | Dai | H04L 1/206 |
| 2022/0327052 A1* | 10/2022 | Vijayrao | G06F 12/1475 |
| 2022/0370667 A1* | 11/2022 | Gui | A61L 2/22 |
| 2022/0405223 A1* | 12/2022 | Erler | G06F 13/4221 |
| 2023/0027585 A1* | 1/2023 | Weng | H04L 45/745 |
| 2023/0034526 A1* | 2/2023 | Cho | G06F 11/0772 |
| 2023/0051590 A1* | 2/2023 | Tkacik | G06F 11/1076 |
| 2023/0068102 A1* | 3/2023 | Bavishi | G06F 12/1408 |
| 2023/0076599 A1* | 3/2023 | Hung | G06F 9/30072 |
| 2023/0084298 A1* | 3/2023 | Chesney | G06F 9/30043 711/117 |
| 2023/0088569 A1* | 3/2023 | Dutta | H01L 21/76227 257/350 |
| 2023/0143760 A1* | 5/2023 | Kelley | G06F 12/0868 |
| 2023/0188337 A1* | 6/2023 | Bert | H04L 9/0894 713/171 |
| 2023/0205565 A1* | 6/2023 | Jiang | G06F 9/45533 718/1 |
| 2023/0418590 A1* | 12/2023 | Gunyuzlu | G06F 21/575 |
| 2024/0012149 A1* | 1/2024 | Assmann | G01S 7/4865 |
| 2024/0036733 A1* | 2/2024 | Lal | G06F 12/1441 |
| 2024/0073013 A1* | 2/2024 | Lal | G06F 12/1441 |

(56) References Cited

U.S. PATENT DOCUMENTS

2024/0113004 A1* 4/2024 Loh ..................... H01L 25/0655
2024/0119155 A1* 4/2024 Ndu ..................... G06F 21/572
2024/0126438 A1* 4/2024 Suh ...................... G06F 3/0659

* cited by examiner

SECURED COMPUTER MEMORY

TECHNICAL FIELD

The present disclosure generally relates to an electronic circuit. In particular, the present disclosure relates to computer hardware for securing the integrity of data stored in a computer memory.

BACKGROUND

Electronic devices make use of programmable hardware that includes a memory that stores executable code and/or other data that configures the processing circuits of the programmable hardware to provide its designed functionality. As one example, network routers typically include a system-on-chip (SoC or application processor) or other processing circuits (e.g., microprocessors or microcontrollers) and are configured to execute code (e.g., firmware) that configures the processing circuits of the network router to perform the network packet routing functions and to provide a user interface or application programming interface (API) to change network router settings and to monitor network router status information. This firmware image may include, for example, an operating system and application software providing the higher-level functionality. As another example, a neural processing unit may be configured to accelerate computing inferences using a trained neural network (e.g., performing image segmentation to identify portions of an image depicting different types of real-world objects), where the trained neural network is represented as a collection of parameters or coefficients stored in firmware and loaded by the neural processing unit to perform the forward-propagation of information through the neural network. As a more general example, computing devices such as smartphones, laptops, desktop computers, servers, and the like load software application code into memory of the computing device to be executed and may also load data into memory to be analyzed or processed by the application code to generate results.

The above information disclosed in this Background section is only for enhancement of understanding of the present disclosure, and therefore it may contain information that does not form the prior art that is already known to a person of ordinary skill in the art.

SUMMARY

According to one embodiment of the present disclosure, a memory protection circuit is configured to: receive data to be written to a memory; iteratively update a running integrity verification value based on portions of the data to determine a calculated integrity verification value and write the portions of the data to a memory region in the memory; determine a verification result based on a comparison between the calculated integrity verification value and a reference integrity verification value associated with the data; and control access to the memory region of the memory based on the verification result.

The memory protection circuit may be configured to block access to the memory region in a case where the verification result indicates a verification failure of the data.

The memory protection circuit may be further configured to: receive a start memory address associated with the data to be written to the memory; and define the memory region based on: the start memory address and an end memory address; or the start memory address and a size of the memory region.

The memory protection circuit may be configured to update the running integrity verification value based on the portions of the data concurrently with writing the portions of the data to the memory region of the storage medium of the memory.

The calculated integrity verification value may include a cryptographic digest computed based on a cryptographic hash function.

The calculated integrity verification value may be computed based on a message authentication code.

The message authentication code may be a cryptographic message authentication code.

The calculated integrity verification value may be computed based on a linear checksum of the data stored in the memory region of the memory.

The calculated integrity verification value may be computed based on a nonlinear checksum of the data stored in the memory region of the memory.

The calculated integrity verification value may be computed based on an error-correcting code or an error detecting code on the data stored in the memory region of the memory.

The data written to the memory region may be encrypted, and wherein the memory protection circuit may be configured to: receive a read command directed to a memory address range in the memory region; and decrypt the data stored in the memory address range of the memory region of the memory in response to the read command.

The memory protection circuit may be further configured to: receive a read command; authenticate the read command based on a digital signature; and block the read command based on an authentication failure of the read command.

The memory protection circuit may be further configured to re-verify the data stored in the memory region during idle clock cycles to: re-calculate the calculated integrity verification value; and recompute the verification result based on the calculated integrity verification value; and control access to the memory region based on the verification result.

The verification result may indicate a verification success of the data, the memory protection circuit may be configured to set a status of the memory region to a locked status, and the memory protection circuit may be configured to block writes to the memory region when the memory region is in the locked status.

According to one embodiment of the present disclosure, a memory system includes: a storage medium configured to store data; a memory protection circuit configured to: receive data to be written to the storage medium; iteratively update a running integrity verification value based on portions of the data to be written to the storage medium to determine a calculated integrity verification value; compute a verification result based on the calculated integrity verification value and a reference integrity verification value associated with the data; and control access to the data stored in the storage medium based on the verification result; and an interface connected to the memory protection circuit and configured to communicate with an interconnect.

The storage medium may be a dynamic random access memory, and the storage medium and the memory protection circuit may be on a same semiconductor die.

The memory system may be configured to communicate with a processor over the interconnect, the processor being on a semiconductor die separate from the storage medium and the memory protection circuit.

The storage medium may be a hard disk, and the memory protection circuit may be integrated with a hard disk controller configured to read and write data on the hard disk.

According to one embodiment of the present disclosure, a non-volatile computer readable medium includes stored instructions, which when executed by a processor, cause the processor to generate a digital representation of an integrated circuit including a memory protection circuit configured to: receive data to be written to a memory; iteratively update a running integrity verification value based on portions of the data to determine a calculated integrity verification value and write the portions of the data to a memory region in a storage medium of the memory; compute a verification result based on a comparison between the calculated integrity verification value and a reference integrity verification value associated with the data; and control access to the memory region of the memory based on the verification result.

The non-volatile computer readable medium may store instructions such that the memory protection circuit is configured to block access to the memory region in a case where the verification result indicates a verification failure of the data.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
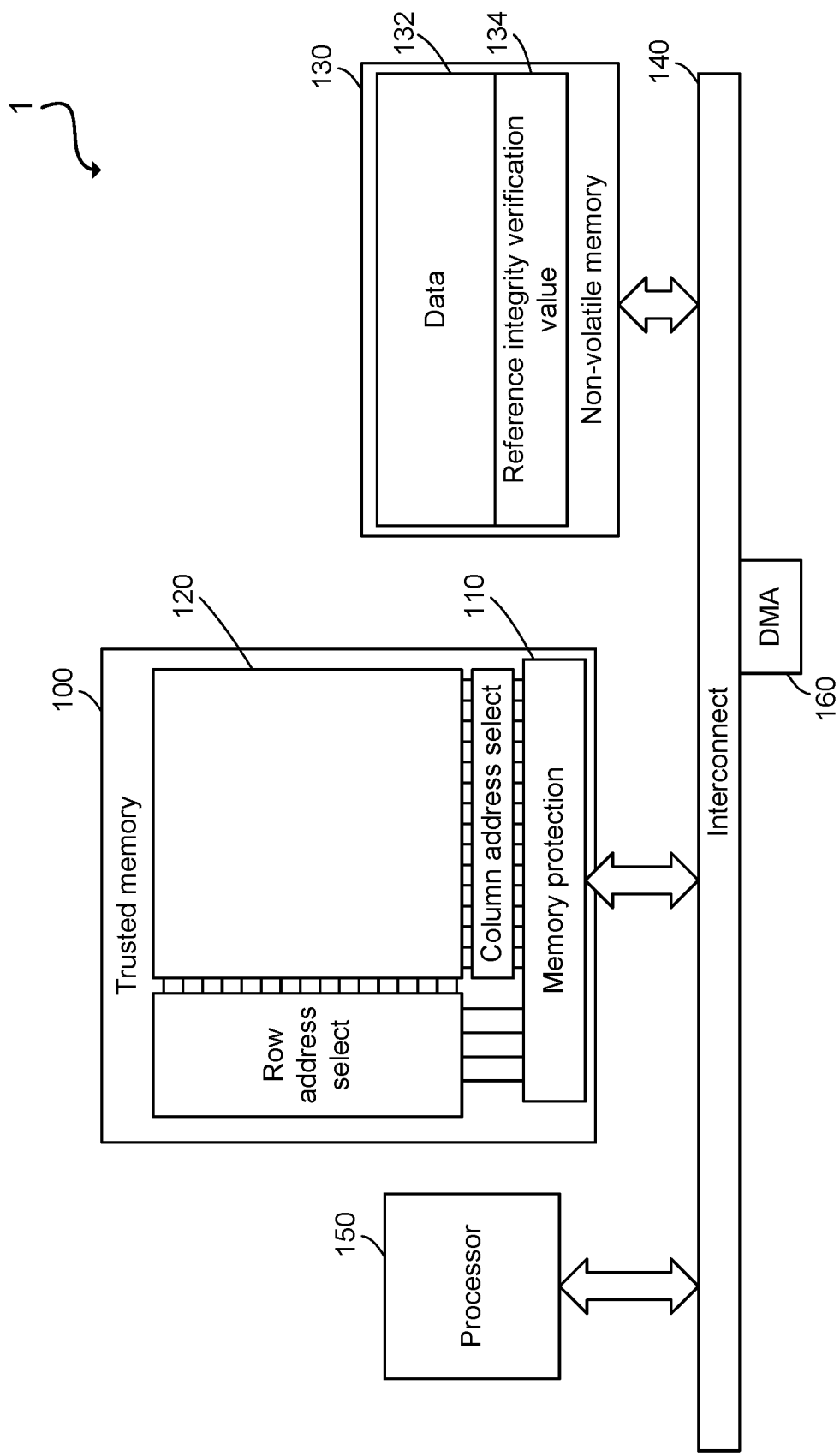
FIG. 1A is a block diagram of a computing device including a memory unit or trusted memory unit, according to one example of the present disclosure.

Aspects of the present disclosure relate to secured computer memory.

Many types of electronic devices are configured using firmware, which may include specialized software and/or other configuration data, where the firmware provides low-level control over those electronic devices. In the case of an embedded system, a firmware image may include, for example, an operating system and application software that implements the higher-level functionality or may omit the operating system and have application software directly controlling hardware devices of the embedded system. These electronic devices also include computer systems such as end-user computing devices (such as smartphones, tablet computers, laptop computers, and desktop computers) and infrastructure (such as server computers, which may in a data center).

One example of an embedded system is a network router, which, as mentioned in the background, typically includes a system-on-chip (SoC or application processor) or other processing circuits (e.g., microprocessors or microcontrollers). The processing circuits of the router are configured to execute firmware that configures those processing circuits of the network router to perform the network packet routing functions such as tracking the network addresses of devices that are connected to various ports or connected to a wireless access point provided by the network router, and transmitting data packets to the appropriate ports or wireless channels based on the network addresses identified in the network packets. The firmware may also include software that provides a user interface or application programming interface (API) to change network router settings and to monitor network router status information.

Another example is a neural processing unit, which may be configured to accelerate computing inferences or making predictions using a trained neural network. One example of such a trained neural network is a convolutional neural network that is trained to perform image segmentation to identify portions of an image depicting different types of real-world objects. Other examples include trained neural network for performing speech recognition or for performing signal processing. These trained neural networks may be represented as collections of parameters or coefficients or weights that are stored in firmware and loaded by the neural processing unit to perform the forward-propagation of information through the neural network (e.g., by accelerating the computation of matrix multiplication operations and non-linear activation functions). The weights or parameters may also be used to configure a neural network implemented by executable code running on a general-purpose processor or a combination of a general-purpose processor and a neural accelerator (e.g., a processor configured to accelerate the computation of functions commonly used in neural networks).

As a more general example, computing devices load executable code into memory, such as an operating system kernel, device drivers, application software, hypervisors for managing virtual machines, and the like.

Some electronic devices provide a capability for the firmware to be updated or replaced by writing a firmware image to the memory of the electronic device. For example, while some electronic devices use a permanent memory (e.g., a permanent read-only memory) to store the firmware in a manner that cannot be overwritten, many devices allow the firmware to be updated or replaced through a special firmware update procedure. These firmware updates are useful for, for example, fixing bugs that are detected after the release of the product, addressing newly discovered security vulnerabilities in the firmware, and adding new features and functionality to the electronic device. Likewise, many computing devices allow operating system software and application software to be updated to fix bugs and to add new features.

Malicious parties may modify the firmware, software, or other data on the electronic device to control its behavior. For example, malicious firmware installed on a network router may cause the network router to participate in distributed denial of service (DDoS) attacks on internet resources (e.g., as part of a botnet).

Accordingly, some electronic systems include processing circuits to verify firmware, executable code, or other data before making use of that data. Such verification processes include applying an integrity, authentication, and/or confidentiality check using a sequencer or hardware security module (HSM) connected to the processor and memory through an interconnect. For example, during a boot process, executable code and/or data is copied from non-volatile memory (NVM) into on-chip memory (e.g., memory on the same die as a processor, such as in the case of a microcontroller). The sequencer or HSM reads the loaded data from the on-chip memory over an interconnect or bus to calculate a checksum based on the content of the loaded data. This calculated checksum is then compared against a known-good reference checksum received from a trusted source. When the calculated checksum matches the reference checksum (e.g., the values are equal), then the loaded data is determined to be valid and the sequencer or HSM indicates that the loaded data can be trusted (e.g., in the case of executable code, the loaded data can be executed by the processor or otherwise can be used to configure a system, such as configuring the parameters or weights of a neural network). If the checksums do not match (e.g., are not equal), then it is presumed that the loaded data is different from the known-good copy of the firmware (e.g., due to tampering or other data corruption), and the unauthorized data is not used by the electronic device (e.g., not executed in the case of executable code, not used to set configuration parameters, or not used to perform calculations).

However, in a case where the sequencer or HSM is located away from the storage location of the data being verified (e.g., on a separate die from the memory), it is possible for the data stored in the memory to be corrupted or otherwise modified after the sequencer or HSM has performed its verification check. For example, vulnerabilities in the electronic device platform may make it possible for data (e.g., executable code, configuration parameters, or other data) loaded into memory of the electronic device to be modified through, for example, memory corruption attacks (e.g., buffer overflow attacks) even if the HSM previously verified the data.

Accordingly, some aspects of the present disclosure relate to memory protection circuits that are configured to verify data loaded into memory (e.g., by computing checksums, message authentication codes, cryptographic message authentication codes, hash values, hash results, and message digests), where the memory protection circuits also control access to the memory in order to protect against unauthorized modification of the data stored in memory, such as blocking unauthorized writes to the memory and generating alerts when the data has been modified in an unauthorized manner. As a result, the memory protection circuits according to examples of the present disclosure ensure that the data stored in the associated memory can be trusted for execution by the processing circuits (e.g., processors) of the electronic device or for performing other data manipulation (e.g., for configuring a neural network). The present disclosure can be applied to input data, intermediate data temporarily stored in memory during a computation, and/or output data that is streamed through the processing unit.

In some examples of the present disclosure, an integrity verification value (e.g., a checksum, a hash value, a hash result, a message authentication code (MAC), a digest, and message digest) is determined while the data is written into memory. For example, the integrity verification value can be determined by a memory protection circuit according to the present disclosure on a rolling basis as each portion of data (e.g., each block of data) is written to the memory, where the integrity verification value (or accumulated integrity verification value) is updated based on the current integrity verification value and the content of each additional portion of the data, such that a resulting integrity verification value is computed based on all of the values of the entire content of the data that is written (e.g., the final integrity verification value depends on the values of the entire content of the data, such that any change anywhere in the content of the data would result in a change in the final integrity verification value). The computed integrity verification value is then used to verify the written data (such as by determining if the computed integrity verification value matches a reference integrity verification value (e.g., a pre-calculated value) associated with the data) before the newly written data is allowed to be accessed by the processor (e.g., loaded to be executed or provided as input data to a program).

In some examples, the calculation of the integrity verification value is performed only for writes that are designated as being protected, such that other data writes can be performed in other regions of the memory without the additional computational overhead of verifying the data (e.g., computing integrity verification values such as checksums and MACs). These other regions of memory be used to store data that have lower security requirements.

In some examples of the present disclosure, all writes performed to a portion of the memory (e.g., a memory address range or multiple ranges of memory addresses) are included when calculating the integrity verification value. This ensures that, if there were additional, unauthorized writes made to the portion of memory, the checksum calculations associated with these unauthorized writes will cause the calculated checksum to differ from the per-calculated checksum.

In some examples of the present disclosure, additional writes to memory locations corresponding to the firmware image after the writing of the firmware image is completed are blocked or denied and, in some examples, such an attempted write to a protected or locked portion or region of the memory triggers an alert or error. In some examples, the electronic device is configured to take further action after detecting such an alert or error, such as restoring the state of the system to a known good state, reducing functionality of the system to known safe behavior, or shutting down the electronic device.

In some examples of the present disclosure, the memory protection circuit is further configured to periodically verify the data stored in the memory by recalculating the integrity verification value of the data, comparing the recalculated integrity verification value to the reference integrity verification value, and generating an alert or error in circumstances where the verification fails. The electronic device may then take further action based on the generated alert or error, as appropriate to the triggering circumstances and the role of the electronic device.

Technical advantages of the present disclosure include, but are not limited to, improving the integrity of data (e.g., a firmware image) stored in memory controlled by a memory protection circuit according to the present disclosure to harden these electronic devices against attacks that attempt to corrupt or modify the code that configures the electronic device to perform functions (e.g., executable program code and/or configuration data). Another technical advantage is that overhead in the form of startup time and power consumption is low because the checksum or hash value calculation is performed by the memory controller circuit according to examples of the present disclosure when the data is initially written or loaded into the memory (e.g., no need for a sequencer or hardware security module or to read the firmware image from the on-chip memory over an interconnect to perform the validation), where the memory controller according to some examples of the present disclosure protects the data from further unauthorized writes (e.g., overwriting parts of the data). Furthermore, there is no need to include a separate sequencer or hardware security module to perform the validation, because the memory controller integrates circuitry configured to perform the validation.

FIG. 1A is a block diagram of a computing device 1 including a memory or trusted memory 100, according to one example of the present disclosure. In the example shown in FIG. 1A, the trusted memory 100 includes a memory protection circuit 110 configured to protect the integrity of data stored in a storage medium 120 (e.g., a plurality of memory cells) of the trusted memory 100. The storage medium 120 of the trusted memory 100 may be implemented using any of a variety of data storage technologies including, but not limited to, memory cells of dynamic random-access memory (DRAM), static random-access memory (SRAM), non-volatile memory (e.g., flash memory, such as in a solid-state drive or SSD), hard disk drives (e.g., stored in bit cells on a hard disk platter), and the like. FIG. 1A presents a particular example of memory implemented as DRAM, but the present disclosure is not limited thereto.

Data may be loaded into the storage medium 120 of the trusted memory 100 from a data source that is external to the trusted memory 100. FIG. 1A shows an example where the external source is a non-volatile memory 130 connected to the trusted memory 100 over an interconnect 140. However, the external source may include other types of devices attached to the computing device 1 that can communicate with the trusted memory 100, such as network interfaces (e.g., wired or wireless local area network interfaces or cellular modems), local serial or parallel interfaces (e.g., universal serial bus or USB), and the like.

The data 132 to be loaded into the trusted memory 100 is associated with a corresponding reference integrity verification value 134 (e.g., a pre-calculated value), such as a checksum, a hash value or hash result, a message authentication code (MAC), a cryptographic MAC, a digest, or the like. As the term is used herein, an integrity verification value or checksum is a value that is computed by a function that is dependent on the contents of a data object. In some examples, the integrity verification value has a fixed size or fixed length that is independent of the size or length of the data. For example, the integrity verification value may have a length of 256 bits, regardless of whether the integrity verification value was calculated based on the contents of one row or cache line of data (or "message") in a memory (such as the trusted memory 100) or based on the contents of one gigabyte of data.

In some embodiments, the reference integrity verification value 134 is stored in the non-volatile memory 130 in an encrypted format (e.g., is encrypted before being stored in the non-volatile memory 130), where the encryption key for the encrypted reference integrity verification value 134 is accessible to the memory protection circuit 110. While FIG. 1A shows the reference integrity verification value 134 as being stored in the non-volatile memory 130, embodiments of the present disclosure are not limited thereto.

Figure 1B:
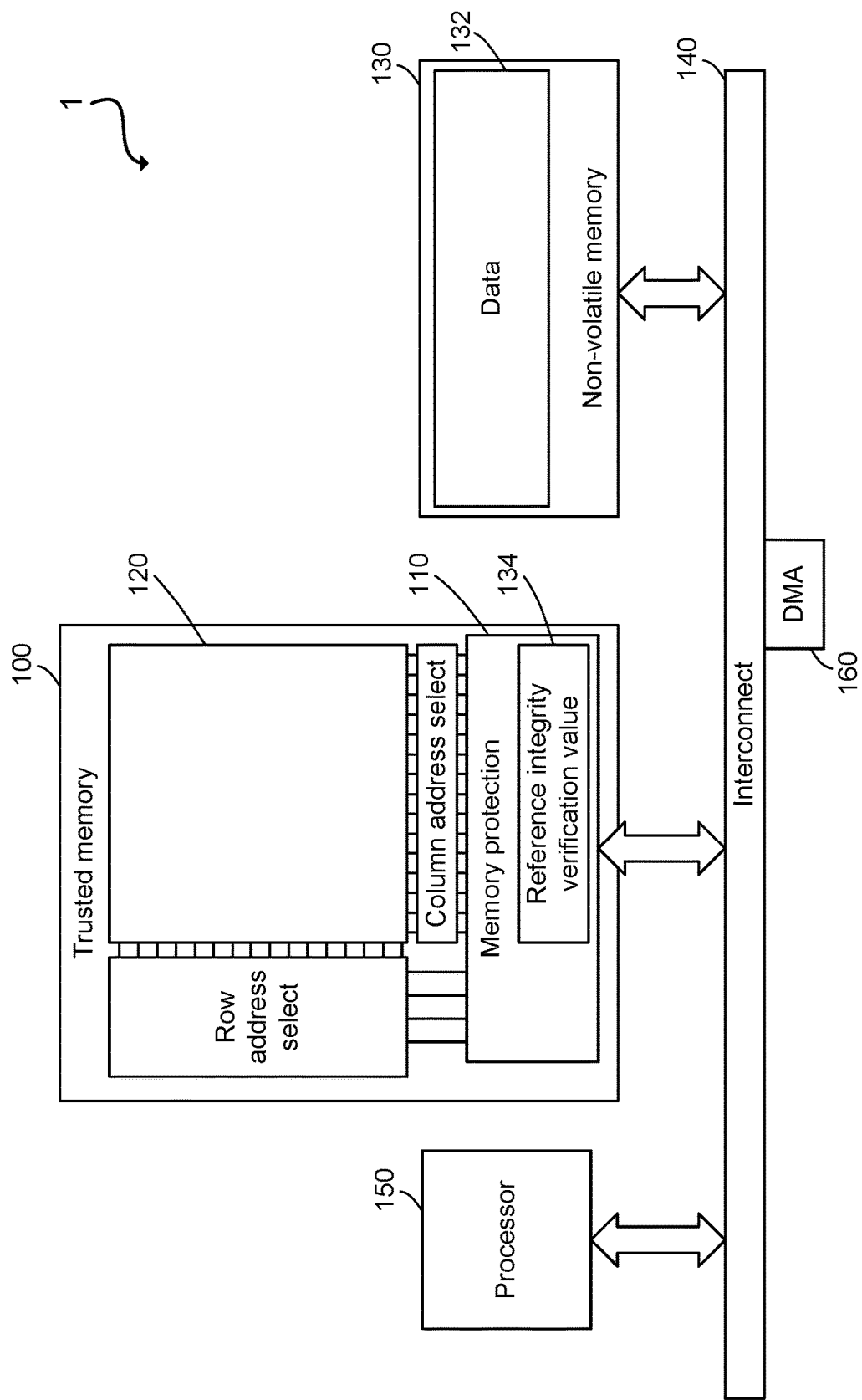
FIG. 1B is another block diagram of a computing device including a memory unit or trusted memory unit, according to one example of the present disclosure.

FIG. 1B is another block diagram of a computing device including a memory unit or trusted memory unit, according to one example of the present disclosure substantially similar to FIG. 1A, but differing in that the reference integrity verification value 134 is stored instead, for example, in the memory protection circuit 110, such as in a register or memory (e.g., DRAM or SRAM) on a same semiconductor die as logic processing circuits of the memory protection circuit 110. In some embodiments of the present disclosure, the reference integrity verification value is stored on a semiconductor die separate from the memory protection circuit 110, such as in a one-time programmable (OTP) memory. In other embodiments of the present disclosure, the reference integrity verification value is stored in a read-only memory connected to the interconnect 140. In any of the embodiments described above, the reference integrity verification value 134 may be stored in an encrypted form.

In some examples, the integrity verification value is computed based on a linear checksum function that can be expressed as a linear combination of different portions of the corresponding data (e.g., a linear combination of different blocks of the data), e.g., where different blocks of the data are combined based on linear operations of scaling by constant coefficients and adding (e.g., XORing) the scaled terms.

In some examples, the integrity verification value is computed based on a nonlinear checksum function, e.g., where the non-linear checksum function includes operations other than the linear operations described above.

In some examples, the computation of the integrity verification value may be referred to as an error-detection code or error-detecting code in that a mismatch between a computed integrity verification value and a reference integrity verification value represents the detection of a change or error in the associated data.

In some examples, the integrity verification value is computed based on an error-detecting code or an error correcting-code, which enables errors to be detected and, in the case of an error-correcting code, also enables a limited number of errors to be corrected. Examples of error-detecting codes include a parity code, a checksum code, and a hash function code. Examples of error-correction codes include, but are not limited to, cyclic redundancy checks (CRCs), Reed-Muller codes, Reed-Solomon codes, Turbo codes, and low-density parity-check (LDPC) codes.

A hash function H is, generally, a function that maps an arbitrary, variable-length input data (or bitstring) s into a fixed-length string h=H(s). The fixed-length string h may be referred to as a hash value (or hash result, digest, or message digest) computed by applying the hash function H to the input string s.

A cryptographic hash function refers to a hash function that exhibit both a one-way property and a collision-free property. The one-way property is that, given a hash function H and a hash result h=H(s) for some variable-length input string s, it is computationally hard (e.g., computationally infeasible) to find the input message s. The collision-free property is that, given hash function H and a first input s, it is computationally infeasible to find a second input s' that has a same hash result as the first input s such that H(s)= H(s). Examples of cryptographic hash functions include but are not limited to: Secure Hash Algorithm 2 (SHA-2), Secure Hash Algorithm 3 (SHA-3), BLAKE, and Whirlpool.

A keyed hash is a cryptographic hash in which the mapping to a hash result is varied by a second input parameter that is a cryptographic key. The hash result of a keyed hash process may also be referred to as a message authentication code (MAC) or tag. A keyed hash may be used to confirm that the message came from a stated sender and has not been changed. For example, a symmetric encryption system may be used to encrypt the hash value h using a secret key. A receiver of the system may then decrypt the encrypted hash value and confirm that the decrypted value matches the hash value calculated based on the received data. As another example, the hash function may take a key as an additional input when generating the hash result. A receiver with access to the same key re-calculates the hash result based on the received data and the key and determines whether there is a match between the received reference tag and the newly calculated tag.

As another example, a public-key cryptographic function may be used to encrypt a hash value h using a private key of a public-private key pair in an asymmetric encryption system. Accordingly, a receiver of the data and the encrypted hash value h can decrypt the hash value using the corresponding public key of the public-private key pair and then confirm that hashing the associated data results in a value that matches the decrypted reference hash value. This provides authentication of the received data (e.g., confirmation that the source of the keyed hash result possessed the associated private key. Such a system may be referred to as a digital signature, in that the hash value or hash result h is digitally signed by the sender.

Accordingly, the data 132 and its associated reference integrity verification value 134 are supplied to the trusted memory 100 via the interconnect 140, where the memory protection circuit 110 verifies that the data 132 can be trusted using the reference integrity verification value 134, as will be described in more detail below with respect to FIG. 2. The reference integrity verification value 134 may be stored in the memory protection circuit 110 or may be stored on the interconnect 140, such as in a read-only memory (ROM). If the data passes verification, then the memory protection circuit 110 allows a processor 150 to access this data as stored in the storage medium 120. If the data fails verification (e.g., a computed integrity verification value generated by the memory protection circuit 110 does not match the received reference integrity verification value 134), then the memory protection circuit 110 may generate an error signal, which may be supplied to the processor 150.

As noted above, a memory protection circuit 110 integrated the trusted memory 100 according to various examples of the present disclosure provides verification of data stored in the trusted memory 100 without relying on a separate sequencer circuit or HSM circuit connected to the external source (e.g., non-volatile memory 130) and the memory 100 via the interconnect 140. This integration of the memory protection circuit 110 with the trusted memory 100 also provides protection against subsequent modification of the data stored in memory after being verified by the sequencer or HSM circuit. The memory protection circuit 110 may be integrated with the trusted memory 100 such as by being integrated with a memory controller or other controller configured to control the writing of data to the storage medium 120 (e.g., memory cells) and reading of data from the storage medium 120 in response to commands received via the interconnect 140 (e.g., commands from the processor 150 or a direct memory access or DMA circuit 160).

In some examples, a direct memory access (DMA) circuit (or DMA engine) 160 performs direct transfer of data (e.g., reads and writes) between different entities through the interconnect 140, without an intermediate step of copying the data to the processor 150. For example, a DMA circuit 160 may enable data to be copied directly from an external source (e.g., non-volatile memory 130) to the trusted memory 100, rather than first copying the data into the processor 150 (e.g., into registers of the processor) and then copying the data from the processor 150 to the trusted memory 100.

In various examples of the present disclosure, the memory protection circuit 110 and the processor 150 may have various physical arrangements, such as being on different semiconductor dies or on the same semiconductor die. In circumstances where the memory protection circuit 110 and the processor 150 are on different semiconductor dies, these dies may be in a same semiconductor package (e.g., as different chiplets in the semiconductor package) or in separate semiconductor packages. The physical form and communication protocols used by the interconnect 140 may vary depending on the particular physical arrangement of these parts, and different types of physical interconnect 140 and communication protocols may be used for communications between the trusted memory 100 and the processor 150 versus communications between the trusted memory 100 and an external source or peripheral devices such as a non-volatile memory 130. These variations will be discussed in more detail below, after describing the operation of a memory protection circuit 110 according to various examples of the present disclosure.

Figure 2:
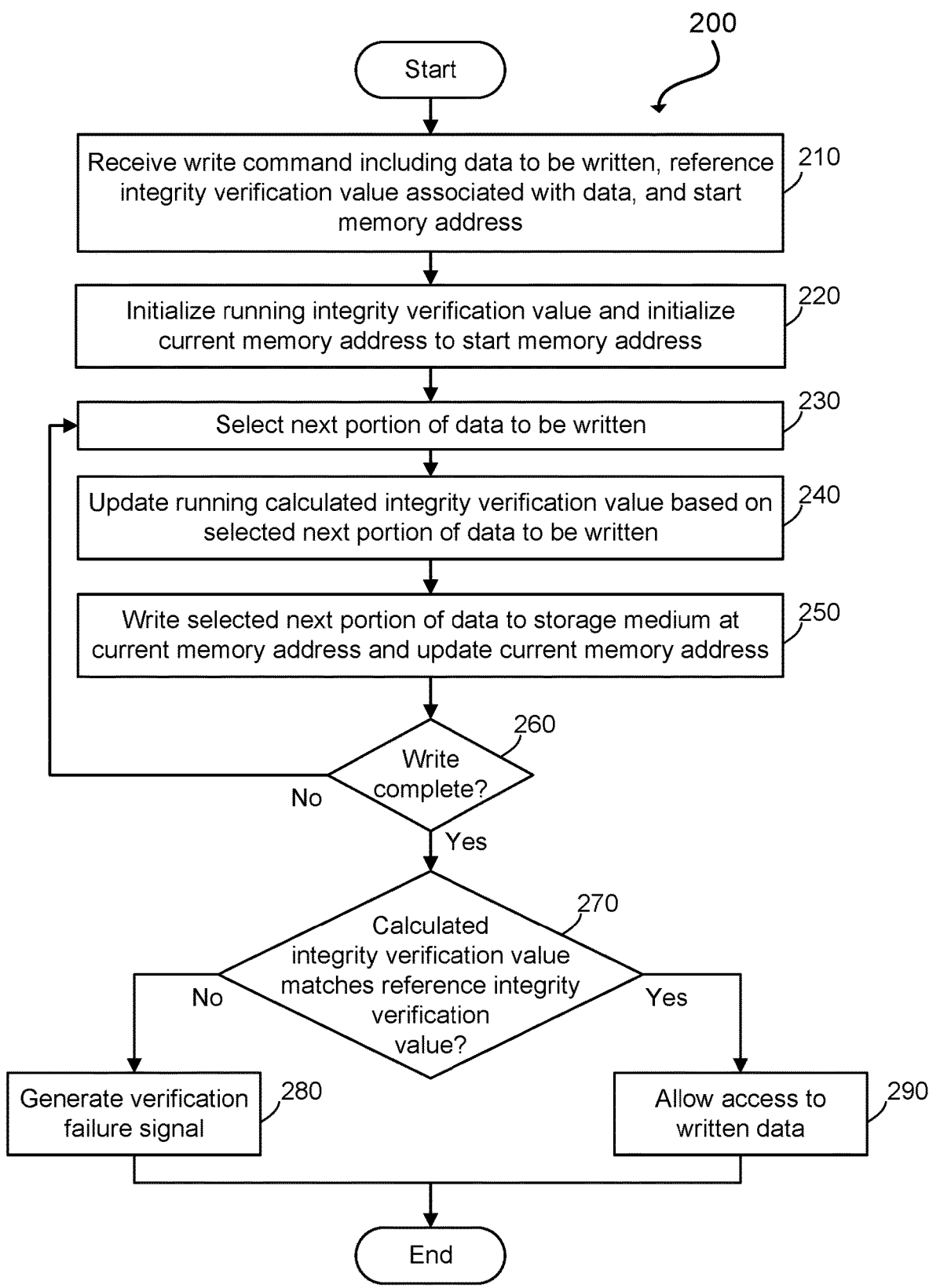
FIG. 2 is a flowchart depicting a method for verifying data to be written to a trusted memory, according to one example of the present disclosure.

FIG. 2 is a flowchart depicting a method 200 for verifying data to be written to a trusted memory, according to one example of the present disclosure. At 210, a memory protection circuit 110 receives a write command to perform a verified write to a trusted memory 100, such as the storage medium 120 of the trusted memory. The memory protection circuit 110 integrated into the trusted memory 100 may be integrated into a memory controller of the trusted memory 100 such that the memory protection circuit 110 may control the reading and writing of data to the storage medium 120, such as by providing control signals to the memory controller or by directly controlling read and write operations.

The received command includes, or provides references to (e.g., pointers to memory addresses or address ranges of the external medium) the data 132 to be verified and written to the trusted memory 100 and a reference checksum or integrity verification value 134. In some examples of the present disclosure, the command further includes a start memory address within the storage medium 120 indicating a first memory address at which the data is to be written. The form of the start memory address corresponds to the type of memory address provided to a memory controller configured to control a corresponding type of memory. For example, in examples where the storage medium 120 is DRAM or SRAM, the memory address may be a physical address (or physical memory address), and in examples where the storage medium is a block storage device such as a hard disk drive or flash memory in the form of a solid-state drive, the memory address may be a logical block address.

In some examples, the command further includes an end memory address, indicating the last memory address at which the data is to be written (e.g., where the content of the data is stored in the memory addresses from the start memory address until the end memory address). In some examples, the command includes an indication of a length or size of the data to be written, and the end memory address may be omitted (e.g., the end memory address can be determined by adding the length or size of the data to the start memory address).

At 220, the memory protection circuit 110 initializes a running integrity verification value (e.g., to a value of zero) and initializes a current address to a start address. The running integrity verification value (or accumulator) is an intermediate value that is updated during each iteration of a loop in which the memory protection circuit iterates through the values of the content of the data stored in the protected memory region (e.g., from the start memory address to the end memory address). In some examples, at a given point in the iterative process, the running integrity verification value represents an integrity verification value of the portion of the data that has been analyzed thus far. Accordingly, after iterating through all of the data in the protected memory region, the running integrity verification value holds an integrity verification value computed based on the entire content of the data stored in the protected memory region. In example embodiments where a start address is not supplied, the memory protection circuit 110 may automatically select a start address representing the start of a contiguous block of memory that is large enough to store the full data. The memory address range from the start address to the end address may be referred to as a destination write address range. In the case where the amount of data to be written is small, the entire data may be written at a single address (e.g., where the start address and the end address are the same, where the single address may correspond to, for example, a single cache line in the case of DRAM or a single block in the case of a block storage device). In some examples of the present disclosure, during the process of performing the trusted write, the memory protection circuit 110 maintains a flag or other state indicator that the destination write address range is in an unlocked state, in which writes can be performed to addresses within the destination write address range.

At 230, the memory protection circuit 110 selects a next portion of the received data to be written, such as by iteratively taking next portions of the data (e.g., where each portion is the size of a cache line).

At 240, the memory protection circuit 110 updates the running calculated integrity verification value based on the selected next portion of the data to be written. Various processes for computing checksum values, hash results, or other integrity verification values may apply different techniques for computing an updated integrity verification value based on a current portion of data to be hashed and a running integrity verification value representing a hash result for all the portions of the data that have been hashed so far. For example, some techniques for computing checksum values or hash values may apply a checksum function or hash function to the current portion (or block) of data to compute a current block integrity verification value (e.g., checksum or hash result) for the current block of the data, then combine the current block integrity verification value with the running integrity verification value (e.g., by computing a bitwise XOR of the running integrity verification value and the integrity verification value computed from the current block). As noted above, some examples of hashing algorithms include Secure Hash Algorithm 2 (SHA-2), Secure Hash Algorithm 3 (SHA-3), BLAKE, and Whirlpool.

At 250, the memory protection circuit 110 writes the selected next portion of the data into the storage medium 120 at the current address. In some example embodiments, the memory protection circuit 110 also updates the current address with the next available address (e.g., incrementing to the next consecutive memory address).

At 260, the memory protection circuit 110 determines if the write command is complete, such as whether all of the data received in connection with the write command has been accounted for in computing the running integrity verification value and all of that data has been written to the storage medium 120. If not, then the memory protection circuit 110 continues by proceeding with selecting the next portion of the data to be written at 230.

When all of the data associated with the write command has been written, then, at 270, the memory protection circuit 110 determines whether the calculated integrity verification value (e.g., the running integrity verification value) matches the reference integrity verification value 134. In some embodiments, the reference integrity verification value 134 is received with the data as part of the write command. In some embodiments, the memory protection circuit 110 receives the reference integrity verification value 134 directly from another source (e.g., other than the memory 130), such as from an OTP memory or ROM connected to the memory protection circuit 110 (e.g., within the trusted memory 100 or connected to the trusted memory 100 through the interconnect 140).

If the values do not match (verification failure), then, at 280, the memory protection circuit 110 determines that verification of the data failed and generates a verification failure signal. Determining a failure of the verification process may also prevent the processor 150 or other devices to read from the address range corresponding to the data that failed verification (e.g., from the start address until the end address, where the end address may be provided as part of the write command or computed based on the start address and the length of the data).

If the values match, then the data was successfully verified (verification success) and, at 290, the memory protection circuit 110 allows the processor 150 to read the written data 290 (e.g., to execute the computer instructions represented by the data, to configure parameters of a program and/or the system, and/or to supply the data as input to a program). In some examples, the memory protection circuit 110 also sets the state of the memory address range in which the data was written to a locked state. As will be discussed in more detail below, the memory protection circuit 110 controls access to data stored within the specified memory address range based on its state of being locked or unlocked. The memory address range specified by the trusted write command may be referred to herein as a protected memory address range.

In some examples, the memory protection circuit 110 generates an output signal that indicates a status of the integrity check or verification status (e.g., the outcome of the comparison between the computed integrity verification value and the reference integrity verification value). The output signal may be supplied, for example, to a memory controller integrated with the memory protection circuit 110, such that the memory controller can permit or deny access to data stored at addresses in the protected memory address range based on the verification status output signal. In some examples, a representation of the output signal may be transmitted to the processor 150 for determining whether or not code and/or data can be loaded from the trusted memory 100 in accordance with the verification status.

As such, a memory protection circuit 110 according to various examples of the present disclosure provide protection against modification of the data stored in the protected memory address range, due to failure of the verification check (e.g., mismatch between a calculated checksum, calculated hash, or calculated integrity verification value and a corresponding reference integrity verification value provided together with the data). Because the memory protection circuit 110 is integrated with a memory controller for controlling access to the trusted memory 100, the memory protection circuit 110 can further prevent access to data that fails the verification process, thereby protecting the system from executing code having unauthorized modifications or using data (e.g., configuration parameters or other input values) that has been modified from its original, authorized form.

In some circumstances, the trusted memory 100 may receive additional write commands while performing the verification and writing of trusted data in response to the command to perform the verified write (e.g., while in the unlocked state). For example, additional write commands may be received while the memory protection circuit 110 is iteratively updating the running calculated integrity verification value and writing the data to the storage medium 120 at 230, 240, 250, and 260 of method 200 shown in FIG. 2.

In some circumstances, these additional write commands are directed to memory addresses outside of the protected memory address range associated with the verified write command (e.g., based on the start and end memory addresses associated with the verified write command), e.g., where the destination memory addresses do not overlap with the protected memory address range. However, in some circumstances, these additional write commands are directed to memory address ranges that do overlap with the memory address range associated with the verified write command, such that, if these additional writes were performed, they would overwrite the data located in the protected memory address range.

In some examples of the present disclosure, all writes that are directed to memory addresses within the memory address range specified by the trusted write command are included when the memory protection circuit 110 calculates the running integrity verification value. If these additional writes performed concurrently with the trusted write command, such that the additional writes are executed before the completion of the trusted write command, the running computed integrity verification value would also be updated based on the content of the data in these additional writes. In such a case, the final computed integrity verification value would be computed based on additional data that was not present when generating the reference integrity verification value, such that the computed integrity verification value would not match the reference integrity verification value and the verification would fail at 270 of the method shown in FIG. 2.

As a simple example, a verified write command may write data and specify a start address of 0x2010 and an end address of 0x2014 to sequentially write data values A, B, C, D, and E. While writing the data and iteratively updating the running integrity verification value (or running checksum), another write command may write data having value C' to address 0x2012. If the additional write of data value C' occurs, e.g., between the writing of values D and E, then the running integrity verification value will be computed based on the values A, B, C, D, C', and E. However, the reference integrity verification value was computed based on the values A, B, C, D, and E, thereby resulting is a mismatch between the integrity verification value computed over the course of the write and the reference integrity verification value. As a result, the memory protection circuit 110 detects a verification failure of the data stored in the memory (e.g., values, A, B, C', D, and E) and therefore prevents access to this corrupted data.

In some examples of the present disclosure, the memory protection circuit 110 blocks all additional writes while a verified write is in progress. For example, in some examples, the memory protection circuit 110 causes all write commands received during a verified write to be blocked or to wait (e.g., where the write commands are queued) until the verified write command has finished writing the data to the memory address range specified by the verified write command. In some examples, the memory protection circuit 110 only causes write commands directed to the memory address range associated with the verified write commands to be blocked or to wait until the verified write command has completed. In some embodiments, instead of queuing, these additional writes may be canceled entirely, such as by returning an error signal over the interconnect 140 to portion of the system that issued the write command (e.g., the processor 150 or the DMA circuit 160).

In some examples of the present disclosure, the memory protection circuit 110 blocks (e.g., prevents or queues) additional write commands that are received during comparison (e.g., at 270 of the method 200 shown in FIG. 2) of the computed integrity verification value and the reference integrity verification value (e.g., determining whether there is a match between the reference checksum or hash value and the checksum or hash value computed from the data received with the write command), after completing the computation of the integrity verification value and the writing of the data to the storage medium 120.

Accordingly, aspects of examples of the present disclosure relate to a memory protection circuit 110 that secures the data and the electronic device against authorized writes while performing a verified write of data (e.g., where the memory protection circuit 110 performs the computation of an integrity verification value of data concurrently with writing the data to a storage medium 120 and verifies that the integrity verification value matches a reference integrity verification value before allowing access to the data).

In some examples of the present disclosure, the memory protection circuit 110 blocks read commands requesting data stored in memory addresses in the protected memory address range (e.g., between and including the start address and the end address associated with a trusted write command) while the trusted write command is in progress (e.g., while the data is being written and/or verified or while the protected memory address range is in the unlocked state).

Figure 3:
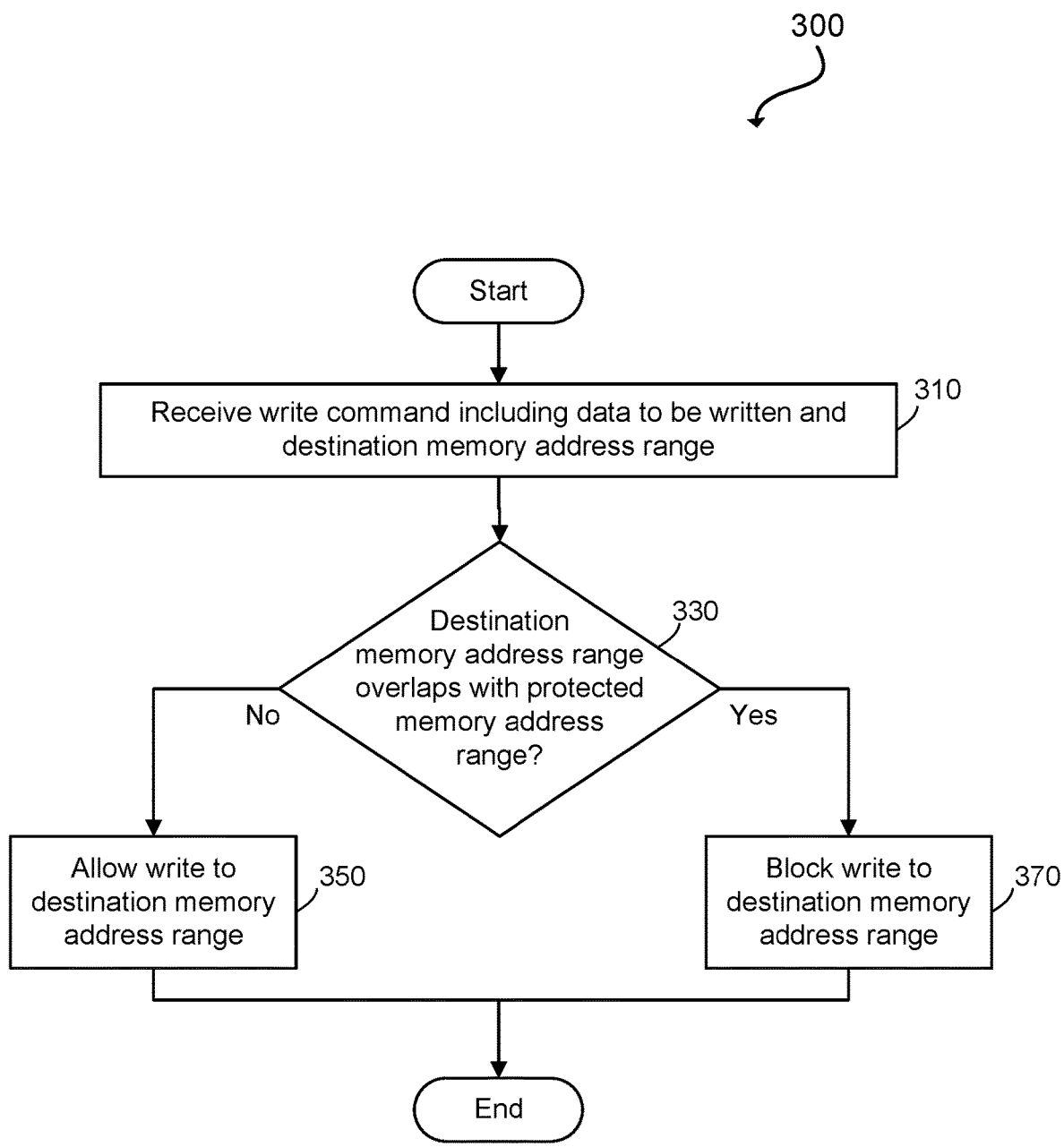
FIG. 3 is a flowchart of a method for blocking unauthorized writes to a trusted memory, according to one example of the present disclosure.

In some examples of the present disclosure, the memory protection circuit 110 prevents further writes to the protected memory address range storing verified data (e.g., while the protected memory address range is locked). FIG. 3 is a flowchart of a method 300 for blocking unauthorized writes to a trusted memory, according to one example of the present disclosure.

At 310, the memory protection circuit 110 receives a write command including data to be written and a destination memory address. The write command may specify a range of addresses, such as by specifying a start memory address and an end memory address or a start memory address and a size of the data to be written. The destination memory address referred to herein may be any destination memory address within the range of addresses specified by the write command. For example, if the write command specifies a memory address range of 0x3000 to 0x3500, then any address in that range, such as 0x3001, may be referred to as a destination memory address.

At 330, the memory protection circuit 110 determines if the destination memory address overlaps or falls within the protected memory address range. As noted above, the protected memory address range may be, e.g., a portion of the trusted memory 100 that is in a locked state after performing a successful verified write of data establishing the protected memory address range and verifying that the content of the data written to the storage medium 120 at locations corresponding to the protected memory address range have an integrity verification value that matches an associated reference integrity verification value.

In a case where the memory protection circuit 110 determines that the destination memory address range does not overlap with the protected memory address range, then the memory protection circuit 110 allows the write to be performed to the destination memory address range at 350.

On the other hand, in a case where the memory protection circuit 110 determines that the destination address range does overlap with the protected memory address range, then the memory protection circuit 110 blocks the write to the destination memory address range at 370. In some examples, the memory protection circuit 110 further generates a signal or alert or alarm to indicate that there was an unauthorized attempt to write to the protected memory address range, as will be described in more detail below.

While the above description of the method 300 of FIG. 3 refers to a single protected memory address range, the present disclosure is not limited thereto and may be include multiple protected memory address ranges storing different data that has been verified. In some such examples, the memory protection circuit 110 determines, at 330, whether the destination memory address range overlaps with any of the protected memory address ranges.

In more detail, in some examples of the present disclosure, the memory protection circuit 110 may include internal data storage (e.g., registers, static random-access memory, or the like) configured to store state information about a protected memory region, including the protected memory address range (e.g., start memory address and end memory address) of the protected memory region (or a start address and an offset or size to calculate the end memory address), the reference checksum associated with the data stored in the protected memory region, and a flag indicating whether the protected memory region has a locked state or an unlocked state. In a case where there are multiple protected memory regions, each protected memory region is associated with corresponding state information.

In many electronic devices, executable code (programs) and/or data may be loaded into memory for use and then later overwritten when the code and/or data is no longer needed, such as to make room for other programs or data for performing different tasks or for operating the electronic device in different modes. Therefore, a memory protection circuit 110 according to some examples of the present disclosure further includes an additional input or a reset input to unlock the protected memory region (or a specified protected memory region) such that other data (e.g., another firmware image, executable code, or data) can be written to the region of the storage medium 120 that was previously protected (e.g., the region corresponding to the protected memory region). After unlocking the protected memory region, the other data may be written using a trusted write (with verification by comparing an integrity verification value computed from the data against a reference integrity verification value) or using a standard or untrusted write command (e.g., without performing verification of the data).

Some aspects of examples of the present disclosure relate to automatically re-verifying data stored in a trusted memory. For example, physically harsh operating environments (e.g., high radiation and/or extreme temperatures) may cause corruption of data (e.g., bit flips) stored in the trusted memory 100. As another example, an active attack of an electronic device may attempt to bypass the memory protection circuit 110 to corrupt or otherwise modify data stored in the storage medium 120 of the trusted memory 100. Accordingly, periodic re-verification of the data stored in a protected memory region through the re-computation of the integrity verification value and comparison of the recomputed integrity verification value against the reference integrity verification value can detect such modifications to the data, after successfully completing a trusted write command to the trusted memory.

Figure 4:
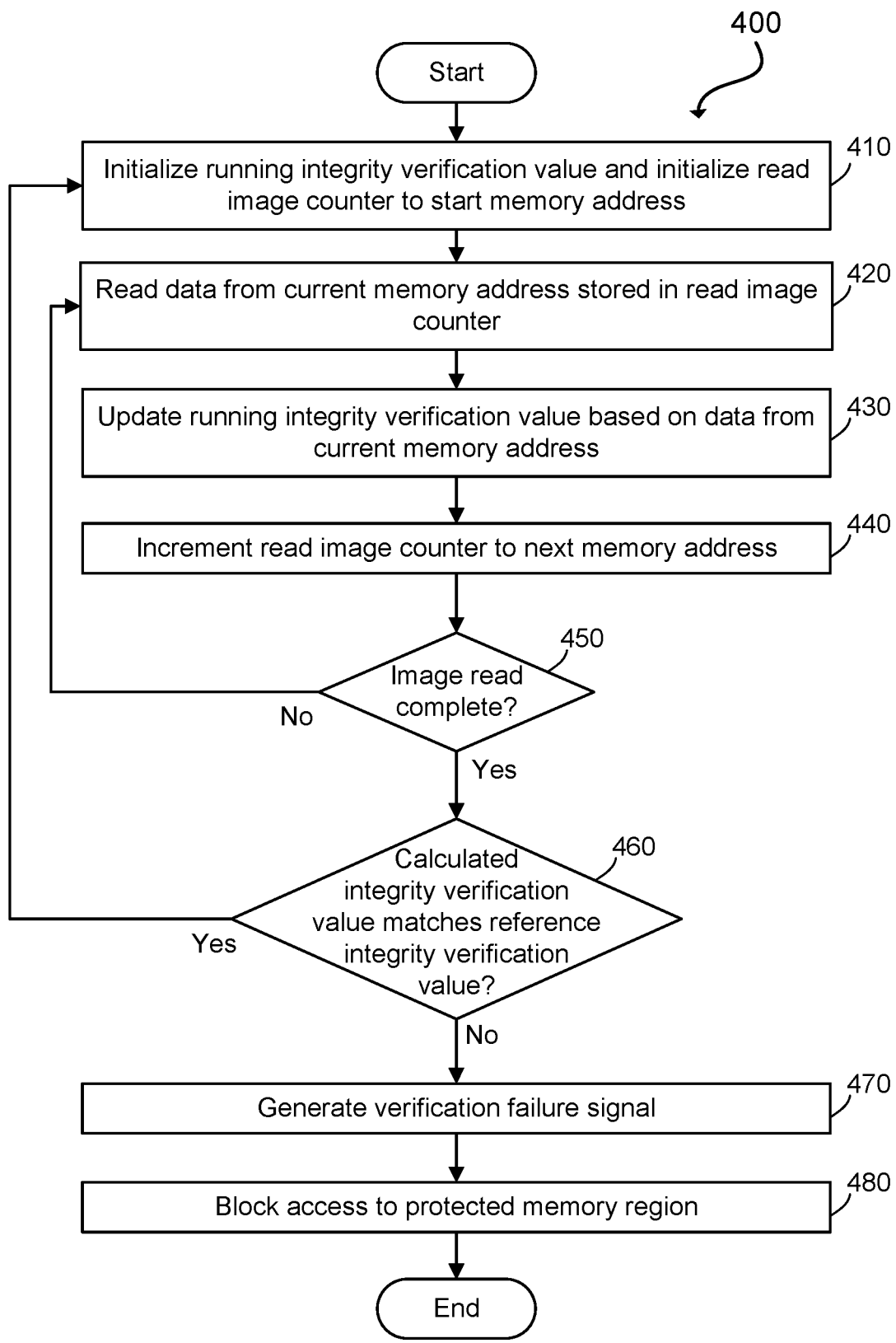
FIG. 4 is a flowchart of a method for periodically re-verifying the data stored in a trusted memory, according to one example of the present disclosure.

FIG. 4 is a flowchart of a method 400 for periodically re-verifying the data stored in a trusted memory according to one example of the present disclosure. In some examples of the present disclosure, the method is performed during unused clock cycles or during idle clock cycles, such as while the memory protection circuit 110 is not responding to read or write request commands received over the interconnect 140 or, in some cases, if there are excess clock cycles available to the memory protection circuit, interleaved with the processing of commands (e.g., while waiting for a write of a portion of data to the storage medium 120 to be completed).

As shown in FIG. 4, the memory protection circuit 110 begins a process for periodically re-verifying the data stored in a protected memory region of the trusted memory 100 by initializing a running integrity verification value (e.g., setting the running integrity verification value to zero or some other initial value based on the particular technique used to calculated verification values, such as particular hashing techniques for computing hash results) and by initializing a counter (or read image counter) to identify a start memory address (e.g., by setting the counter to the start memory address or setting the counter to zero, as indicating an offset from the start memory address). The counter identifies a current memory address that is to be analyzed next in the process of computing the integrity verification value from the data stored in memory.

At 420, the memory protection circuit 110 reads the data stored at a current memory address identified by the counter (e.g., the memory address directly represented by the counter or based on the start memory address of the protected memory region and an offset specified by the counter).

At 430, the memory protection circuit 110 updates the running integrity verification value based on the data read from current memory address, and at 440, the memory protection circuit 110 increments the counter (the read image counter) to the next memory address (e.g., by updating the offset).

At 450, the memory protection circuit 110 determines whether the image (e.g., data stored in the protected memory region) has been read in its entirety such that the running integrity verification value has been computed based on the full content of the data stored in the protected memory region. In the particular example shown in FIG. 4, the memory protection circuit 110 may determine that the image read is complete when the counter (the read image counter) is greater than the end memory address of the protected memory region (assuming that protected memory region includes the end memory address) or when the counter is greater than or equal to a size of the data (e.g., where the offset points to a value past the end of the protected memory region).

In a case where the memory protection circuit 110 determines that the image read is not complete (e.g., that the running integrity verification value does represent all of the data stored in the protected memory region between the start memory address and the end memory address), then the memory protection circuit 110 returns to 420 to read the data at the next memory address, as identified by the counter (the read image counter).

In a case where the memory protection circuit 110 determines that the image read is complete, then, at 460, the memory protection circuit 110 determines whether the calculated integrity verification value (e.g., the running integrity verification value after analyzing all the data in the protected memory region) matches the reference integrity verification value (e.g., provided with the original trusted write command along with the data and stored in the memory protection circuit 110).

In a case where the calculated integrity verification value does match the reference integrity verification value, then the memory protection circuit 110 determines that the data stored in the protected memory region has not been modified (e.g., its integrity has not been violated) and restarts the verification process at 410 by reinitializing the running integrity verification value and the counter (the read image counter).

In a case where the calculated integrity verification value does not match the reference integrity verification value, then the memory protection circuit 110 generates an alert or verification failure signal at 470. In some examples, the memory protection circuit 110 may further block access to the protected memory region at 480 (e.g., because the data stored in the protected memory region has been modified).

As noted above, in some examples, the method 400 is performed during unused clock cycles of the memory protection circuit 110, e.g., is performed by a low-priority thread or process running in the background and can be preempted by higher priority threads or processes that are configured to respond to incoming read or write commands for data to be read from or written to the trusted memory 100.

Some aspects of examples of the present disclosure relate a memory protection circuit 110 that requires authenticated write commands and authenticated read commands, such as where write commands and/or read commands are accompanied by a cryptographic signature based on, for example, the data associated with the write command and/or a reference integrity verification value. The memory protection circuit 110 checks the cryptographic signature to verify that the write command was cryptographically signed by a trusted originating entity (e.g., by decrypting the cryptographic signature with an encryption key associated with the identity of the trusted originating entity). For example, the reference integrity verification value may be a message authentication code (MAC), hash-based message authentication code (HMAC) or variant thereof, where the integrity verification value is computed based on both the content of the data and an encryption key associated with the trusted originating entity.

In a case where the authentication of the write command succeeds, the memory protection circuit 110 continues by performing the write to the storage medium 120 of the trusted memory 100. In a circumstance where the authentication of the write command fails, the memory protection circuit generates an alert (e.g., a signal to the processor 150) and may take further action, as discussed in more detail below.

Likewise, an authenticated read command may also be cryptographically signed, such as by cryptographically signing the address or address ranges that are requested to be read (e.g., from the protected memory region). In this example, the memory protection circuit 110 verifies a digital signature included in the authenticated read command to authenticate the identity of the originator of the authenticated read command. In a case where the authentication fails, then the authenticated read command is ignored or blocked, and the memory protection circuit may generate an error signal and/or log the failed attempt to read from the protected memory region. In a case where the authentication succeeds, then the memory protection circuit 110 will allow the read command to proceed by reading the data from the memory address or memory addresses identified in the read command.

In some additional examples of the present disclosure, the data associated with a trusted write command is also encrypted (e.g., secured by an encryption key stored within the memory protection circuit 110). As a more specific example, the data associated with a trusted write command may be encrypted using a (randomly chosen) symmetric encryption key, and the symmetric encryption key may then be encrypted using a public key associated with the memory protection circuit 110 and cryptographically signed by the sending party. Upon receiving the trusted write command, the memory protection circuit 110 authenticates the cryptographic signature, decrypts the symmetric encryption key using its private key, and decrypts the data using the symmetric encryption key. In some embodiments, the memory protection circuit 110 decrypts the data before writing the data to the storage medium 120, such that the data is stored in decrypted form. In some embodiments, the memory protection circuit 110 writes the data to the storage medium 120 in encrypted form and decrypts the data (e.g., using the symmetric encryption key) in response to read requests for the stored data. As such, examples of the present disclosure further ensure that the data sent in a trusted write command is confidential (e.g., that the data is not tampered with in transit, that the originator of the data is authenticated, and that only the intended recipient parties can view the data).

As noted above, some aspects of examples of the present disclosure relate to generating an error or alert or alarm when various conditions are met, such as a verification failure detected after completing the write (e.g., due to concurrent writes to the protected memory address range while a write is being performed), blocked attempted writes to memory addresses within a protected memory region or multiple protected memory regions, verification failures detected during periodic rechecks, and authentication failures when attempting to authenticate a digitally signed write command received by the memory protection circuit 110.

In response to generating an error or alert or alarm, the electronic device may take further action. The further action may depend on the electronic device and the functionality provided by such a device. Examples of further actions include: shutting down the electronic device; rebooting the electronic device; further restricting access to functionality of the electronic device (e.g., operating in a restricted mode or trusted safe mode, such as operating based on program instructions in a secure read-only memory); initiating a re-verification of the data in the protected memory regions; generating audible alerts to users in the area; logging the events; reporting the events to users via a network connection (e.g., cellular or wired network); or the like. Different actions are applicable based on the role of the device and whether ceasing the provision of functionality of the device would be safe for users or others affected by the electronic device. For example, in the case of an electronic control unit of a motor vehicle, an action taken based on the error or alert may be to operate in a restricted mode with reduced functionality that still allowed the driver to control the vehicle.

Figure 5:
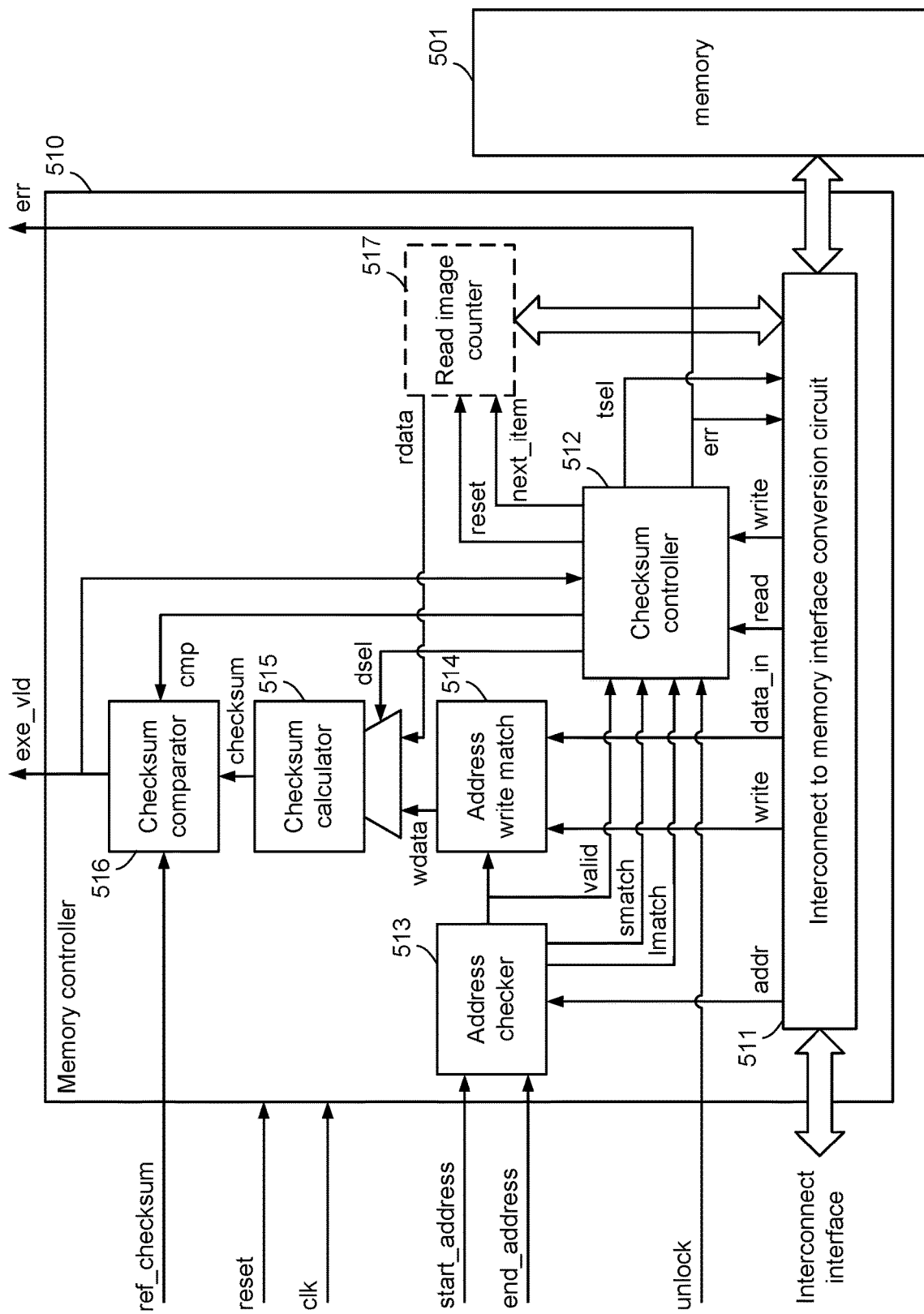
FIG. 5 is a block diagram depicting a memory protection circuit of a memory controller, according to one example of the present disclosure.

FIG. 5 is a block diagram depicting a memory protection circuit 510 of a memory controller, according to one example of the present disclosure, where the memory controller and the memory protection circuit 510 control access to a memory 501. The memory protection circuit 510 of a memory controller shown in FIG. 5 provides one example of how the memory protection circuit 510 can be included in a controller that may be integrated with the trusted memory 100 shown in FIG. 1A and FIG. 1B and the memory protection circuit 510 is one non-limiting example of an implementation of the memory protection circuit 110 shown in FIG. 1A and FIG. 1B. For the sake of convenience, in the context of FIG. 5, the integrity verification value may be referred to as a checksum, without being limited to particular types of verification values, such that the memory protection circuit 510 may be configured to compute, for example, hash results based on hash functions or cryptographic hash functions, message authentication codes, hash-based message authentication codes, or the like in accordance with various examples of the present disclosure.

As shown in FIG. 5, the memory protection circuit 510 of the memory controller takes in various inputs associated with a trusted write command, including a reference integrity verification value (ref checksum in FIG. 5), a start memory address and an end memory address for the protected memory region (start address and end address), and an unlock signal (unlock). The memory protection circuit 510 of the memory controller receives data associated with the trusted write command through an interconnect to memory interface conversion circuit 511 (e.g., connected to the interconnect 140 shown in FIG. 1A and FIG. 1B).

A checksum controller 512 controls the operation of various aspects of the memory protection circuit 510 according to examples of the present disclosure described herein, such as by implementing procedures for verifying data and controlling access to data stored in the memory 501 as discussed above.

When a trusted write command or a write signal is supplied to the memory protection circuit 510, an address checker circuit 513 checks that an address (addr) associated with the write command falls within the protected memory region specified by the start memory address (start address) and the end memory address (end address) and outputs a valid signal to the checksum controller and an address write match circuit 514. The trusted write command, in some embodiments, is built out of multiple signals of the interconnect interface (e.g., in a case where the interconnect interface does not have a connection line for a dedicated write signal). The address checker circuit 513 also generates start and end address signals smatch and lmatch and supplies these signals to the checksum controller 512. The end address signal lmatch is valid when the end-address is matched, and the start address signal smatch is valid when the start-address is matched.

The address write match circuit 514 takes a signal that the current command is a write command (write) and input data (data in) and outputs the corresponding data to be written (wdata) to a multiplexer of a checksum calculator circuit 515. The multiplexer is controlled by a data selection signal (dsel) from the checksum controller 512 to select whether the checksum calculator 515 processes data being written during a write command (wdata) or data already stored in memory (rdata) to update a current running checksum value (e.g., running integrity verification value), which may be stored in the checksum calculator 515. The running checksum value is also output to a checksum comparator circuit 516, which also receives the reference checksum (ref checksum) corresponding to the data. The checksum controller 512 detects the triggering of the start address signal smatch and the end address signal lmatch to determine when the running checksum value has been updated based on all of the data corresponding to the reference checksum. In particular, when both are triggered (in independent order) the checksum controller 512 may output a comparison signal (cmp) to trigger the checksum comparator to compare the reference checksum against the current running checksum from the checksum calculator 515, and to generate a verification result output (exe_vld). Detecting the triggering of the smatch and lmatch signals also enables the memory interface conversion circuit 511 to perform read accesses on memory 501 within the protected region if exe_vld is positive, as the protected region has now been checked for correctness. The verification result output may be supplied out of the memory controller, such as to report the result to the processor 150, which may indicate to the processor 150 that the corresponding data stored in the protected memory region of the memory 501 is verified and can be executed by the processor 150. The verification result output (exe_vld) may also be supplied to the checksum controller 512 such that the checksum controller 512 can also take action based on the result, such as generating an error signal (err) when the verification result output indicates a failure. The error signal (err) may be supplied back to the memory interface conversion circuit 511 to block access to the protected region of the memory 501 and may also be generated as a separate output of the memory protection circuit 510.

In some examples of the present disclosure, the memory protection circuit 510 also includes a counter (a read image counter) 517 configured to store information regarding the current status of a periodic re-verification of data stored in a protected memory region defined by the start memory address (start address) and the end memory address (end address) during idle clock cycles of the memory 501. In some examples, the read image counter 517 stores a counter indicating a current memory address within the protected memory region to be checked, and cause the data at that current memory address to be loaded from the memory 501 into the checksum calculator (e.g., through the rdata signal). A next item signal (next item) is supplied by the checksum controller 512 to increment the counter to identify the next memory address to be checked, and a reset signal (reset) may be used to reset the counter to its initial state.

Accordingly, FIG. 5 presents one example of a memory protection circuit 510 that may be configured to perform operations in accordance with embodiments of the present disclosure. While FIG. 5 presents one example, the present disclosure is not limited thereto and may be implemented with circuits having different arrangements of components and different architectures than those shown in FIG. 5.

A memory protection circuit according to the present disclosure may be located in different portions of the electronic device in various example embodiments of the disclosure. The physical arrangement and electrical connections between the memory protection circuit and the processor generally do not affect the functionality of the memory protection circuit in providing protection against modification of data stored in a trusted memory (e.g., modification due to data corruption from intentional attacks or degradation due to environmental conditions).

In some example embodiments, as discussed below, the memory protection circuit is co-located with, or integrated with, a memory controller configured to control access to the storage medium. In some example embodiments, the memory protection circuit is integrated in the same semiconductor package and/or same semiconductor die as the storage medium.

Figure 6A:
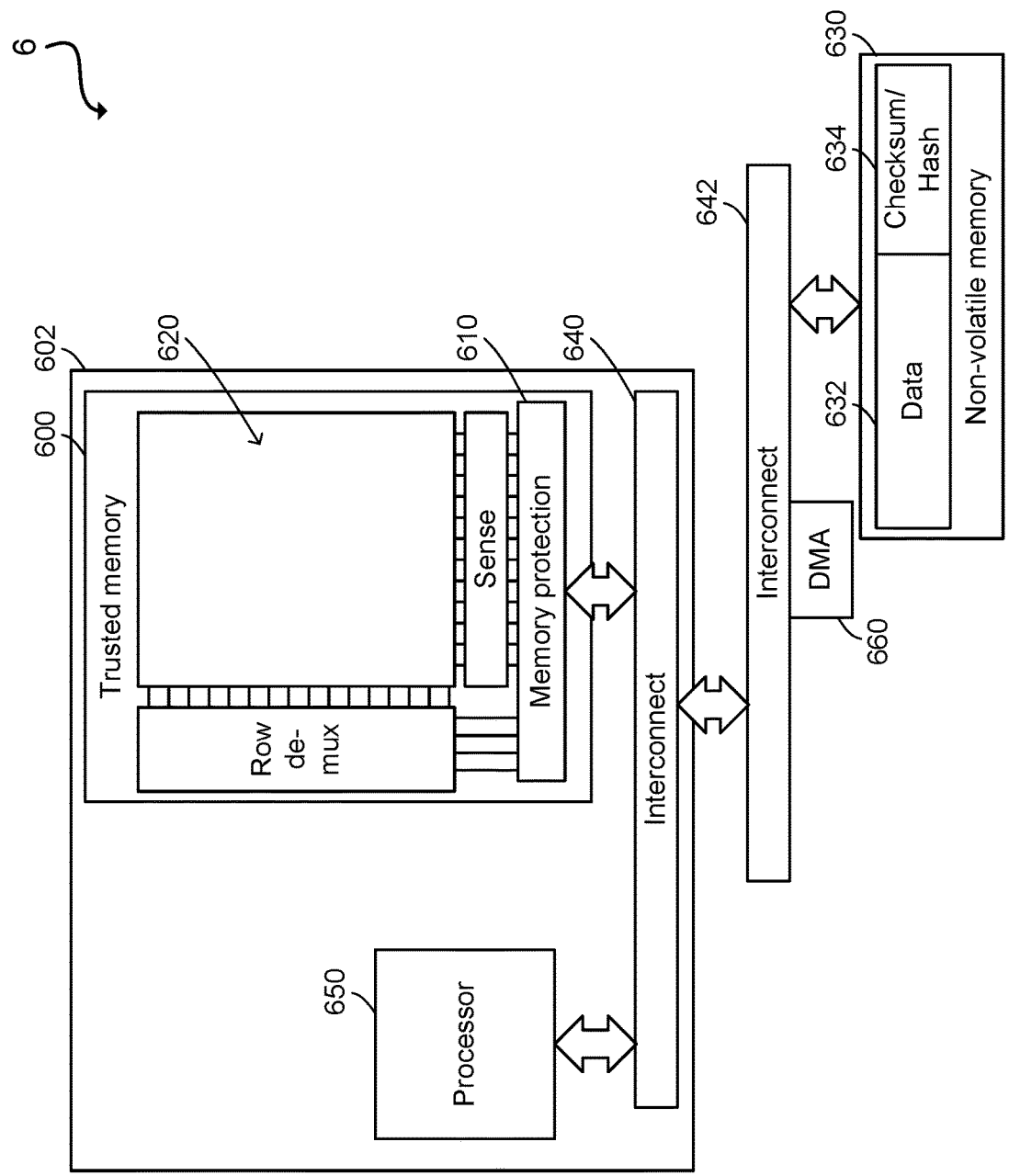
FIG. 6A is a block diagram of a portion of an electronic device similar to that shown in FIG. 1A and FIG. 1B, where the trusted memory and the processor are located on a same semiconductor die, according to one example of the present disclosure.

FIG. 6A is a block diagram of a portion of an electronic device 6 similar to that shown in FIG. 1A and FIG. 1B, where the trusted memory 600 and the processor 650 are located on a same semiconductor die 602 according to one example of the present disclosure. For example, the processor 650 and the trusted memory 600 may be fabricated on a same die as parts of a microcontroller or system-on-a-chip (SoC), where the processor and trusted memory 600 communicate over an interconnect 640 that is also formed on the same die 602. The storage medium 620 of the trusted memory may be, for example, static memory (SRAM) or dynamic memory (DRAM). The trusted memory 600 and the processor 650 may communicate with other parts of the electronic device 6 via another interconnect 642 that is external to the die 602, such as to communicate with a non-volatile memory 630 storing data 632 and an associated checksum or hash or integrity verification value 634. As noted above, in some embodiments, the associated checksum or hash or integrity verification value 634 is stored on the same die 602 as the memory protection circuit 610 instead of in the non-volatile memory 630. A DMA circuit 660 may provide direct memory access between the non-volatile memory 630 and the trusted memory 600.

Figure 6B:
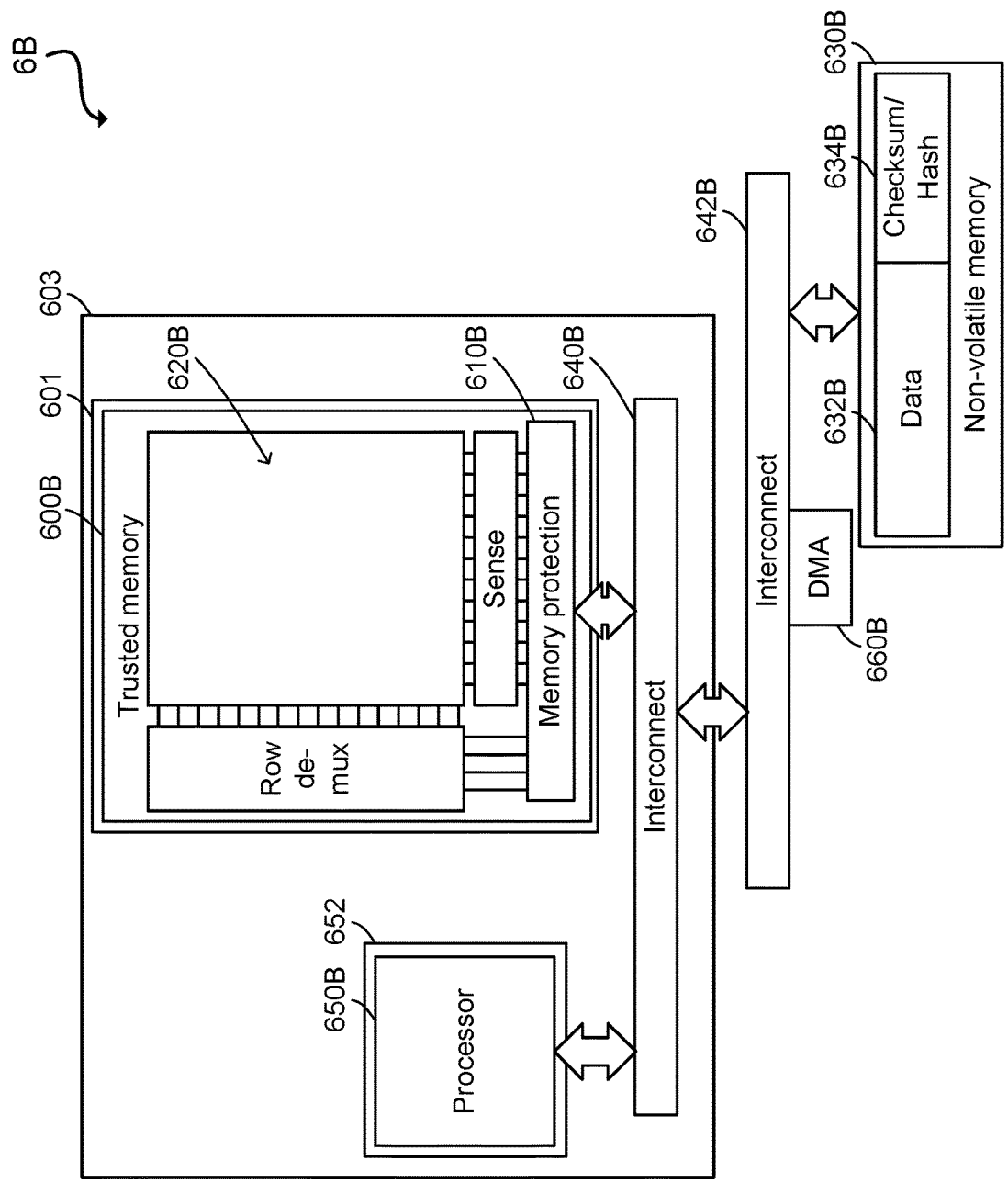
FIG. 6B is a block diagram of a portion of an electronic device similar to that shown in FIG. 1A and FIG. 1B, where the trusted memory and the processor are located on different semiconductor dies that are combined in a single semiconductor package, according to one example of the present disclosure.

FIG. 6B is a block diagram of a portion of an electronic device similar to that shown in FIG. 1A and FIG. 1B, where the trusted memory 600B and the processor 650B are located on different semiconductor dies 601 and 652, respectively, that are combined in a single semiconductor package 603 according to one example of the present disclosure. For example, multiple separate semiconductor dies can be attached as chiplets to an interposer that includes a physical medium serving as the interconnect 640B such that the processor 650B on its semiconductor die 652 can communicate with trusted memory 600B on its semiconductor die 601. In a manner similar that described above, the processor 650B and the trusted memory 600B may communicate with components outside of the semiconductor package 603 via an external interconnect 642B, such as to read data from non-volatile memory 630B storing data 632B and an associated checksum or hash or integrity verification value 634B. As noted above, in some embodiments, the associated checksum or hash or integrity verification value 634B is stored on the same die 601 as the memory protection circuit 610B instead of the non-volatile memory 630B. A DMA circuit 660B may provide direct memory access between the non-volatile memory 630B and the trusted memory 600B.

Figure 6C:
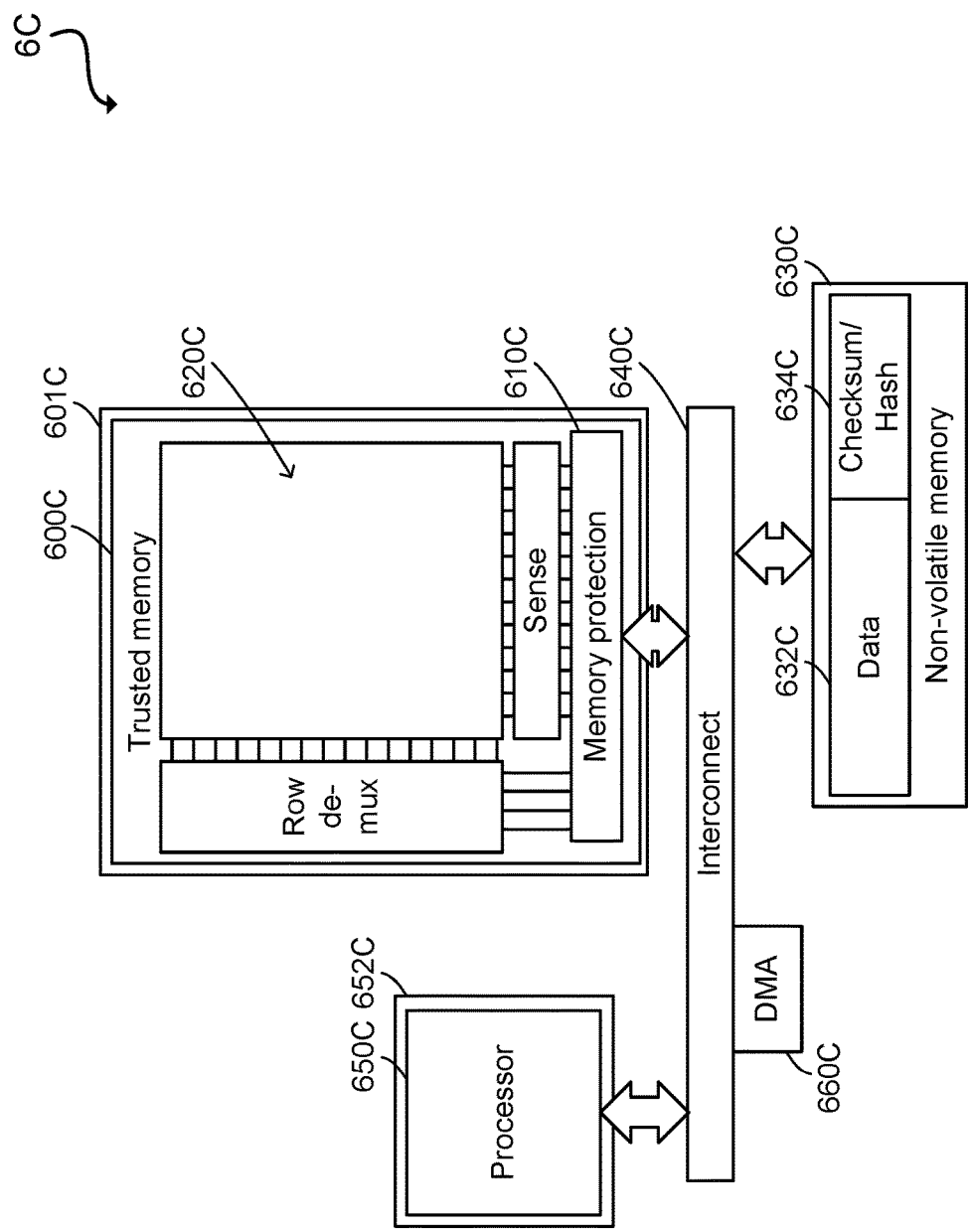
FIG. 6C is a block diagram of a portion of an electronic device similar to that shown in FIG. 1A and FIG. 1B, where the trusted memory and the processor are located on different semiconductor dies in different semiconductor packages, according to one example of the present disclosure.

FIG. 6C is a block diagram of a portion of an electronic device similar to that shown in FIG. 1A and FIG. 1B, where the trusted memory 600C and the processor 650C are located on different semiconductor dies 601C and 652C, respectively, in different semiconductor packages according to one example of the present disclosure. For example, multiple different semiconductor dies in separate packages may be connected through an interconnect 640C on a printed circuit board, an interposer, or attached directly to each other using a package-on-package (PoP) arrangement. In a manner similar that described above, the processor 650B and the trusted memory 600B may communicate with components outside of the semiconductor package 603 via the same interconnect 640C and/or a separate interconnect, such as to read data from non-volatile memory 630C storing data 632C and an associated checksum or hash or integrity verification value 634C. As noted above, in some embodiments, the associated checksum or hash or integrity verification value 634C is stored on the same die 601C as the memory protection circuit 610C, instead of in the non-volatile memory 630C. A DMA circuit 660C may provide direct memory access between the non-volatile memory 630C and the trusted memory 600C.

While FIG. 1A, FIG. 1B, FIG. 6A, FIG. 6B, and FIG. 6C show examples in which the memory protection circuit is integrated with a memory controller of a dynamic random access memory storage medium, the present disclosure is not limited thereto. In some examples, the memory protection circuit is integrated with a memory controller of a static random access memory storage medium. In some examples, the memory protection circuit is integrated with a controller for a hard disk drive. In some examples, the memory protection circuit is integrated internally in a flash memory chip, where the memory protection circuit is configured to receive and process commands from a flash memory controller. In some examples, the memory protection circuit is integrated with a flash memory controller configured to control the reading and writing of data to and from a plurality of flash memory chips (e.g., a controller for a solid state drive or SSD). In some embodiments where the memory protection circuit is integrated with a flash memory controller, the reference integrity verification value may be stored in the flash memory itself, where the flash memory controller protects the memory location in which the reference integrity verification value is stored from being overwritten. As noted above, the reference integrity verification value may also be encrypted. In some embodiments, the flash memory controller prevents the reference integrity verification value and the associated data from being written at the same time (e.g., in a same operation), when the reference integrity verification value is in plain-text and not encrypted with an encryption key, to protect against an attack that wrote both malicious data and a reference integrity verification value for that malicious data to the flash memory.

As such, aspects of examples of the present disclosure provide a memory protection circuit configured to verify the integrity of data during a write process into a trusted memory, to secure the written data against further modifications, including blocking unauthorized writes to a protected memory region storing the data and periodically re-verifying that the data stored in the protected memory region has not been modified. Verification of the integrity of the data is provided by computing an integrity verification value based on the content of the data (e.g., a checksum or a hash result) and comparing the computed integrity verification value against a reference checksum or hash result or reference integrity verification value. In some examples, the reference integrity verification value or other portions of the data are cryptographically signed such that the memory protection circuit can authenticate the origin of the data and/or the reference integrity verification value, and in some examples the data and/or the integrity verification value are encrypted to protect the data in transit.

Figure 7:
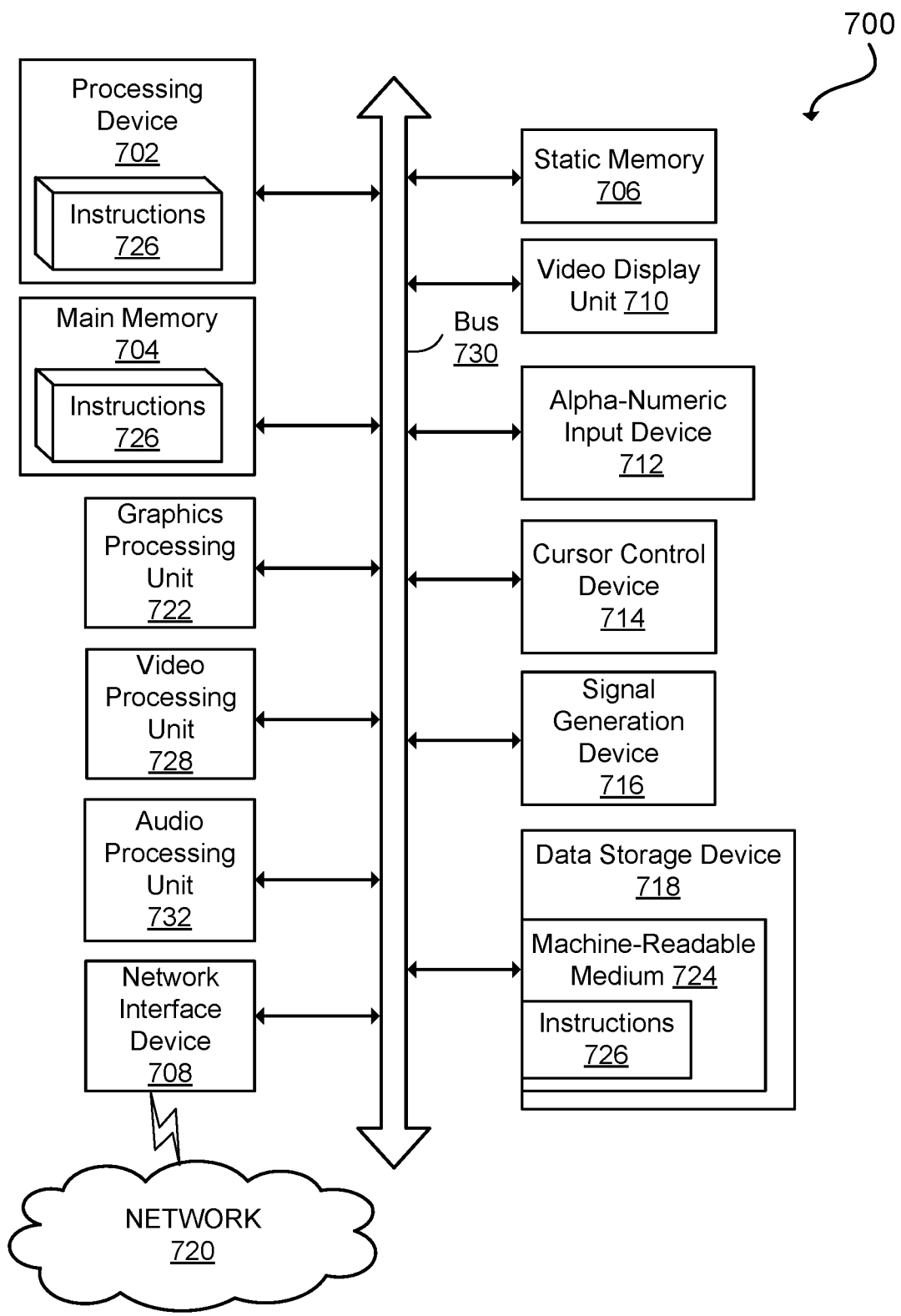
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730. A memory protection circuit according to various examples of the present disclosure may be included in a controller associated with any of these memories, including the main memory 704, the static memory 706, and the data storage device 718, as well as in the processing device 702 to secure any integrated memory within the processing device (e.g., a cache).

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A memory protection circuit configured to:
    receive data to be written to a memory;
    iteratively update a running integrity verification value based on portions of the data to determine a calculated integrity verification value as the portions of the data are being written to a memory region in the memory;
    determine a verification result based on a comparison between the calculated integrity verification value and a reference integrity verification value associated with the data; and
    control access to the memory region of the memory based on the verification result,
    wherein the memory protection circuit is configured to block access to the memory region based on the verification result that indicates a mismatch between the calculated integrity verification value and the reference integrity verification value.

2. The memory protection circuit of claim 1, wherein the memory protection circuit is further configured to:
    receive a start memory address associated with the data to be written to the memory; and
    define the memory region based on:
        the start memory address and an end memory address; or
        the start memory address and a size of the memory region.

3. The memory protection circuit of claim 1, wherein the memory protection circuit is configured to update the running integrity verification value based on the portions of the data concurrently with writing the portions of the data to the memory region of a storage medium of the memory.

4. The memory protection circuit of claim 1, wherein the calculated integrity verification value comprises a cryptographic digest computed based on a cryptographic hash function.

5. The memory protection circuit of claim 1, wherein the calculated integrity verification value is computed based on a message authentication code.

6. The memory protection circuit of claim 5, wherein the message authentication code is a cryptographic message authentication code.

7. The memory protection circuit of claim 1, wherein the calculated integrity verification value is computed based on a linear checksum of the data stored in the memory region of the memory.

8. The memory protection circuit of claim 1, wherein the calculated integrity verification value is computed based on a nonlinear checksum of the data stored in the memory region of the memory.

9. The memory protection circuit of claim 1, wherein the calculated integrity verification value is computed based on an error-correcting code or an error detecting code on the data stored in the memory region of the memory.

10. The memory protection circuit of claim 1, wherein the data written to the memory region is encrypted, and
    wherein the memory protection circuit is configured to:
        receive a read command directed to a memory address range in the memory region; and
        decrypt the data stored in the memory address range of the memory region of the memory in response to the read command.

11. The memory protection circuit of claim 1, further configured to:
    receive a read command;
    authenticate the read command based on a digital signature; and
    block the read command based on an authentication failure of the read command.

12. The memory protection circuit of claim 1, wherein the memory protection circuit is further configured to re-verify the data stored in the memory region during idle clock cycles to:
    re-calculate the calculated integrity verification value; and
    recompute the verification result based on the calculated integrity verification value; and
    control access to the memory region based on the verification result.

13. The memory protection circuit of claim 1, wherein the verification result indicates a verification success of the data,
    wherein the memory protection circuit is configured to set a status of the memory region to a locked status, and
    wherein the memory protection circuit is configured to block writes to the memory region when the memory region is in the locked status.

14. A memory system comprising:
    a storage medium configured to store data;
    a memory protection circuit integrated with the storage medium to control the writing of data to the storage medium, the memory protection circuit being configured to:
        receive data to be written to the storage medium;
        iteratively update a running integrity verification value based on portions of the data to be written to the storage medium to determine a calculated integrity verification value as the portions of the data are being written to a region of the storage medium;
        compute a verification result based on the calculated integrity verification value and a reference integrity verification value associated with the data; and
        control access to the data stored in the storage medium based on the verification result; and an interface connected to the memory protection circuit and configured to communicate with an interconnect, the memory protection circuit being connected between the interconnect and the storage medium.

15. The memory system of claim 14, wherein the storage medium is dynamic random access memory, and
wherein the storage medium and the memory protection circuit are on a same semiconductor die.

16. The memory system of claim 15, wherein the memory system is configured to communicate with a processor over the interconnect, the processor being on a semiconductor die separate from the storage medium and the memory protection circuit.

17. The memory system of claim 15, wherein the storage medium is a hard disk, and
wherein the memory protection circuit is integrated with a hard disk controller configured to read and write data on the hard disk.

18. A non-volatile computer readable medium comprising stored instructions, which when executed by a processor, cause the processor to generate a digital representation of an integrated circuit comprising a memory protection circuit configured to:
receive data to be written to a memory;
iteratively update a running integrity verification value based on portions of the data to determine a calculated integrity verification value as the portions of the data are being written to a memory region in a storage medium of the memory;
compute a verification result based on a comparison between the calculated integrity verification value and a reference integrity verification value associated with the data; and
control access to the memory region of the memory based on the verification result,
wherein the memory protection circuit is configured to block access to the memory region based on the verification result that indicates a mismatch between the calculated integrity verification value and the reference integrity verification value.

* * * * *

UNITED STATES PATENT AND TRADEMARK OFFICE
CERTIFICATE OF CORRECTION

| | | |
|---|---|---|
| PATENT NO. | : 12,387,011 B2 | Page 1 of 1 |
| APPLICATION NO. | : 17/972318 | |
| DATED | : August 12, 2025 | |
| INVENTOR(S) | : Adrianus Wpgg Vaassen | |

It is certified that error appears in the above-identified patent and that said Letters Patent is hereby corrected as shown below:

On the Title Page

Item (71), in Column 1, under "Applicant", Line 1, delete "Mountain View," and insert
-- Sunnyvale, --.

In the Claims

In Column 27, Line 15, in Claim 17, delete "claim 15," and insert -- claim 14, --.

Signed and Sealed this
Thirtieth Day of December, 2025

John A. Squires
*Director of the United States Patent and Trademark Office*